United States Patent
Brouwer et al.

(10) Patent No.: US 12,498,255 B2
(45) Date of Patent: Dec. 16, 2025

(54) X-RAY BEAM CONTROL APPARATUS

(71) Applicant: Varex Imaging Nederland B.V., Doetinchem (NL)

(72) Inventors: Perry Brouwer, Huissen (NL); Frans Monchen, Doetinchem (NL); Bart Overkamp, Aalten (NL)

(73) Assignee: Varex Imaging Nederland B.V., Doetinchem (NL)

( * ) Notice: Subject to any disclaimer, the term of this patent is extended or adjusted under 35 U.S.C. 154(b) by 593 days.

(21) Appl. No.: 17/894,094

(22) Filed: Aug. 23, 2022

(65) Prior Publication Data

US 2023/0081669 A1 Mar. 16, 2023

Related U.S. Application Data

(60) Provisional application No. 63/236,220, filed on Aug. 23, 2021.

(51) Int. Cl.
*G01D 5/20* (2006.01)
*G21K 1/10* (2006.01)
*H01J 35/02* (2006.01)

(52) U.S. Cl.
CPC ............ *G01D 5/2006* (2013.01); *G21K 1/10* (2013.01); *H01J 35/02* (2013.01)

(58) Field of Classification Search
CPC ........... H01J 35/00; H01J 35/02; H01J 35/16; G01D 5/2006; G21K 1/10
See application file for complete search history.

(56) References Cited

U.S. PATENT DOCUMENTS

| 4,481,650 | A | 11/1984 | Kinanen |
| 5,396,889 | A | 3/1995 | Ueda et al. |
| 6,215,853 | B1* | 4/2001 | Kump ............... G21K 1/04 378/151 |
| 9,607,261 | B1 | 3/2017 | Zonana et al. |
| 10,573,453 | B2* | 2/2020 | Cheung ............ G01D 5/2013 |
| 10,756,732 | B2 | 8/2020 | Mahler |
| 2002/0186817 | A1 | 12/2002 | Schukalski et al. |
| 2013/0272504 | A1* | 10/2013 | Deutsch ............ A61B 6/545 378/150 |
| 2015/0022190 | A1* | 1/2015 | Taylor ............... G01D 5/20 331/167 |

(Continued)

FOREIGN PATENT DOCUMENTS

CA 3061602 A1 11/2018
CN 112190273 1/2021

(Continued)

OTHER PUBLICATIONS

Int'l Appl. No. PCT/EP2022/073526, International Search Report dated Feb. 7, 2023.

(Continued)

*Primary Examiner* — David E Smith
(74) *Attorney, Agent, or Firm* — Dorsey & Whitney LLP

(57) ABSTRACT

An x-ray beam control apparatus including at least one moveable x-ray attenuating member, and at least one position sensor, wherein the position sensor is configured to contactlessly detect movement of at least one of the attenuating members and to output a signal indicative of the position of the attenuating member.

20 Claims, 18 Drawing Sheets

(56) References Cited

U.S. PATENT DOCUMENTS

2016/0069662 A1* 3/2016 Mullenix .................. G06F 3/00
  324/207.15
2020/0373923 A1 11/2020 Walsh et al.

FOREIGN PATENT DOCUMENTS

JP   2001056396 A   2/2001
WO   WO-2018200310 A1 * 11/2018 ............... G21K 1/04

OTHER PUBLICATIONS

Int'l Appl. No. PCTEP2022/073526, Written Opinion dated Feb. 7, 2023.
EP Appl. No. 4152345, Partial European Search Report dated Jan. 26, 2023 (7 pages).
EP Appl. No. 4152345, European Search Report dated Apr. 13, 2023 (17 pages).

* cited by examiner

X-RAY BEAM CONTROL APPARATUS

TECHNICAL FIELD

The present invention relates to an x-ray beam control apparatus. The invention also relates to an x-ray device including an x-ray tube and an x-ray beam control apparatus. The invention further relates to a method of obtaining data for use in detecting a position of a collimator member of an x-ray beam control apparatus and a method of obtaining data for use in detecting a position of an x-ray filter assembly of an x-ray beam control apparatus.

BACKGROUND TO THE INVENTION

X-ray producing devices are used in a wide variety of applications, both industrial and medical. Such devices are commonly employed in medical diagnostic examination and therapeutic radiology, these being example medical applications.

In general, x-ray devices produce x-rays when electrons are emitted, accelerated and then impinged upon a material of an appropriate composition, which typically occurs within an evacuated enclosure on an x-ray tube. A cathode, or electron source, is disposed within the evacuated enclosure and an anode is positioned to receive electrons omitted by the cathode.

For example, in operation, an electric current is applied to a filament portion of the cathode, which causes electrons to be emitted by thermionic emission. A high voltage potential between the cathode and anode causes the electrons to form a stream and accelerate towards a focal spot on a target surface of the anode. When the electrons strike the target surface, some of the kinetic energy of the electrons is released as x-rays. The target surface of the anode is positioned and oriented so that the x-rays are emitted through a window in the evacuated enclosure and any outer housing. The emitted x-rays are then directed towards an x-ray subject such as a medical patient.

The x-rays that are emitted do not form a uniform or consistent beam. Electrons that do not strike the focal spot of the anode generally do not result in the production of x-rays that follow the desired path and are commonly referred to as "off-focal" radiation.

An x-ray beam control apparatus such as a collimator can be used to limit the diagnostic x-ray field (e.g., control the shape and position of the x-ray beam) and reduce off-focal radiation.

A collimator may comprise a number of moveable collimator members (or shutters) formed of x-ray attenuating material, such as lead. The collimator members define an opening through which radiation can pass. The opening can be arranged to block off-focal radiation and/or to control the size of the x-ray beam that reaches the patient.

An x-ray control apparatus (such as a collimator) typically provides a default, fixed amount of x-ray filtering. In some instances, it is desirable to control the intensity of the x-ray beam (in addition to, or without, controlling the shape of the x-ray beam). An additional x-ray filter may be positioned in the path of the x-ray beam, between the x-ray tube and the patient, to reduce the intensity of the x-ray beam received at the patient. The additional x-ray filter may be an adjustable filter which can provide different x-ray attenuations. For example, the additional x-ray filter may be moveable between a plurality of positions, with each position providing a different amount of x-ray attenuation.

SUMMARY OF THE INVENTION

In one aspect the present invention provides an x-ray beam control apparatus as defined in claim 1. Optional features are specified in the dependent claims.

In another aspect, the present invention provides an x-ray device as defined in claim 16.

In further aspect, the present invention provides a method of obtaining data for use in detecting a position of a collimator member, as defined in claim 21. Optional features are specified in the dependent claims.

In further aspect, the present invention provides a method of obtaining data for use in detecting a position of an x-ray filter assembly of an x-ray beam control apparatus as defined in claim 17. Optional features are specified in the dependent claim.

It should be appreciated that, although claims 1 and 17 recite at least one inductive position sensor, the invention encompasses other types of position sensors. The position sensor of claim 1 and 17 may, in accordance with the invention, be replaced by a different type of position sensor.

In yet a further aspect, the present invention provides an x-ray beam control apparatus as defined in claim 19. Optional features are specified in the dependent claim.

BRIEF DESCRIPTION OF THE DRAWINGS

For a better understanding of the present invention embodiments will now be described by way of example, with reference to the accompanying drawings, in which.

In the drawings like elements are generally designated with the same reference signs.

DETAILED DESCRIPTION OF EMBODIMENTS OF THE INVENTION

In some countries it is a requirement to register the x-ray dose that a patient receives during an x-ray examination. Excessive x-ray exposure can be harmful, and such a registration allows the total exposure received by an individual over a period of time to be monitored.

The measurement of x-ray dose can be performed by adding a Dose Area Product meter to a collimator, but this additional device may not always be an optimal solution.

Shutter position and/or additional x-ray filter position can be used in the calculation of the x-ray dose that exits an x-ray control apparatus (such as a collimator). The x-ray dose calculation may be based on the actual settings of the x-ray tube (e.g., power, intensity, and/or pulse duration), the known default x-ray filtering of the collimator, the actual additional x-ray filter being used and the actual collimator shutter opening. For example, the additional x-ray filter and shutter position may be measured by mechanically coupled electrical parts with a variable output (e.g. potentiometers). However, current arrangements for determining x-ray dose in this way are: (1) susceptible to wear and (2) have low accuracy due to (a) low accuracy of the hardware components used and (b) mechanical play in the components.

Automatic collimators may be able to provide information to the x-ray system for dose calculation (for example field size and attenuation filter in use) as part of the functionality that selects a collimator shutter position and attenuation filter.

The determination of radiation dose for manual collimators cannot be calculated in the same way as for automatic collimators. Examples of manual collimators are the Optica 10 series and Optica 20 series available from Varex Imaging Corporation.

It would be desirable to provide an accurate and wear resistant arrangement for determining the x-ray dose provided by a collimator or other x-ray control apparatus.

Figure 1:
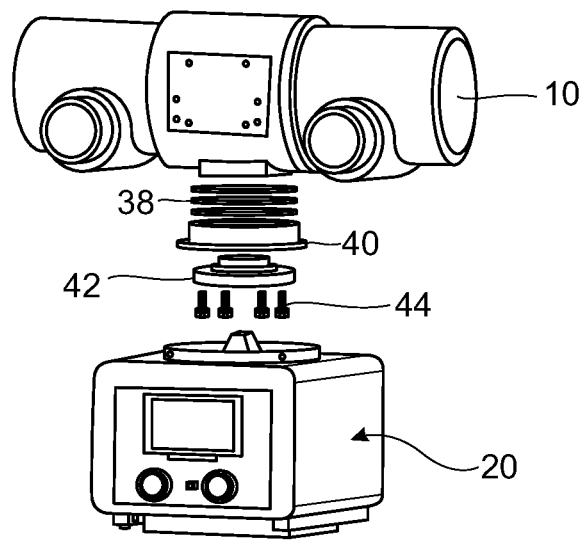
FIG. 1 shows a perspective exploded view of an x-ray device including an x-ray tube and an x-ray beam control apparatus.

As shown in FIG. 1, an x-ray device includes an x-ray tube 10, which generates x-rays, and an x-ray beam control apparatus, such as a collimator device 20, to which the x-ray tube 10 is mounted. The x-ray tube 10 may be of a conventional design.

Figure 2:
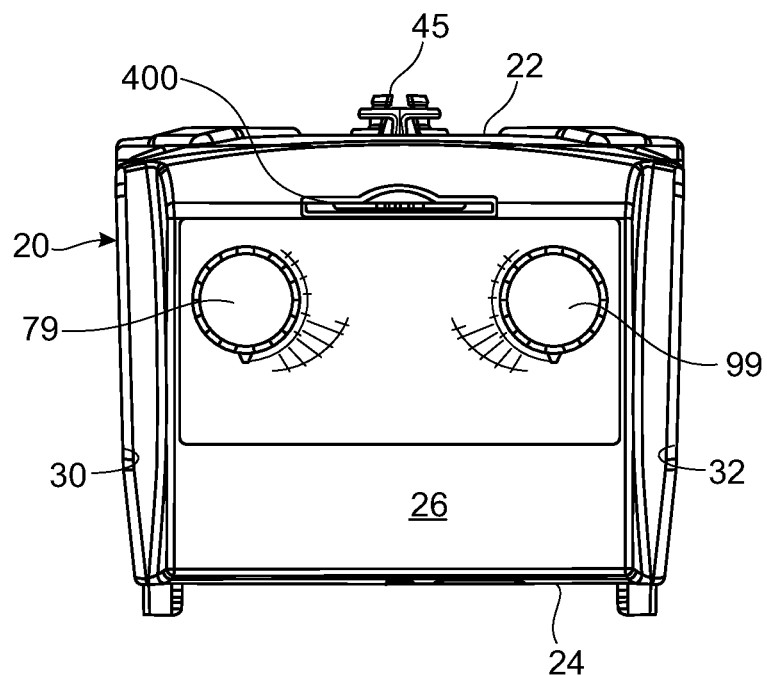
FIG. 2 shows a front elevation of an x-ray beam control apparatus.
Figure 3:
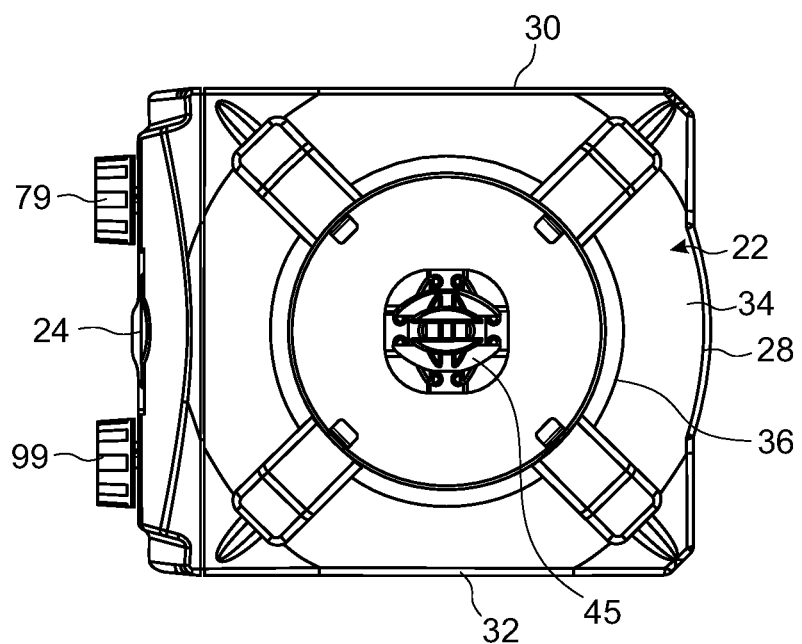
FIG. 3 shows an overhead plan view of the x-ray beam control apparatus of FIG. 2.

As illustrated in FIGS. 2 and 3, The collimator device 20 has a top surface 22 and an opposite bottom surface 24. The top surface 22 and bottom surface 24 are connected by a front panel 26, an opposite rear panel 28, a left side panel 30 (as viewed in FIG. 2) and a right side panel 32 (as viewed in FIG. 2). As used here, left and right are reference as viewed from the front panel 26. The front panel 26 includes control knobs 79 and 99. The top surface 22 of the collimator device 20 includes a mounting plate 34 and a fixing flange 36. Referring back to FIG. 1, the x-ray tube 10 may be connected to the collimator device 20 by one or more spacers 38, a mounting flange 40, a lead insert 42 and fixing screws 44.

An x-ray diaphragm 45 may be provided on the top surface 22 of the collimator device 20. The x-ray diaphragm 45 may help form the x-rays generated from the X-ray tube 10 into a beam of a desired shape.

Other x-ray tube and connection arrangements (not shown) may be used with a collimator device (or other x-ray beam control apparatus) in accordance with an embodiment of the invention.

Figure 5:
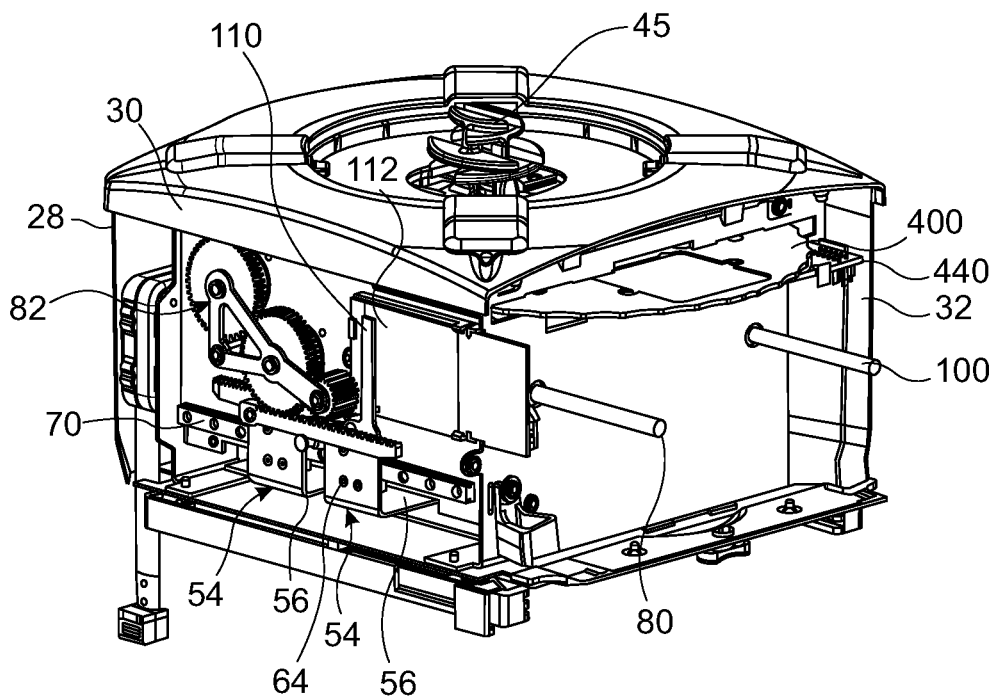
FIG. 5 shows a simplified front perspective view of the x-ray beam control apparatus of FIG. 2 with part of the sides removed.
Figure 6:
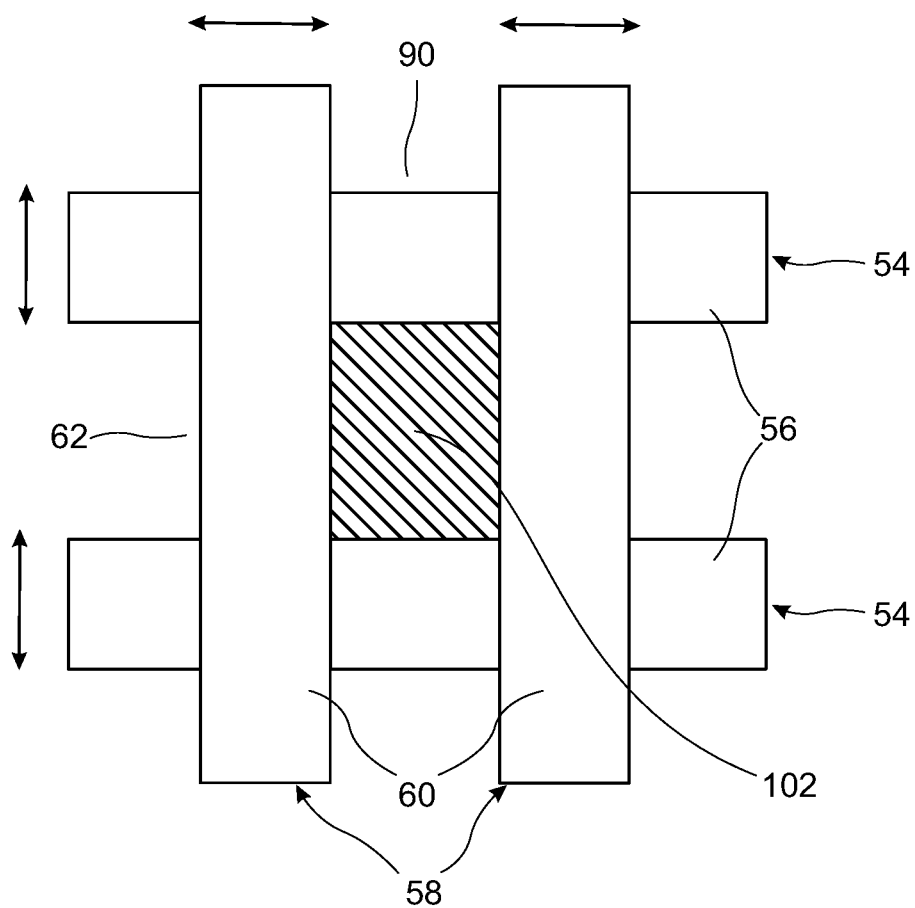
FIG. 6 shows schematically the arrangement of collimator shutters of the x-ray beam control apparatus of FIG. 2.

As shown in FIGS. 5 and 6, the collimator device 20 includes a first pair of shutters 54 (hereinafter referred to as cross shutters) that comprise a main x-ray attenuating portion 56 extending generally parallel to the front face 26 of the collimator device 20 and a second pair of shutters 58 (hereinafter referred to as long shutters) that comprise a main x-ray attenuating portion 60 extending generally perpendicular to the front face 26 of the collimator device 20 (and perpendicular to the main x-ray attenuating portion 56 of the cross shutters 54). In an example, the main x-ray attenuating portions 56 and 60 can include x-ray blocking, absorbing, or attenuating materials, such as lead.

Figure 7:
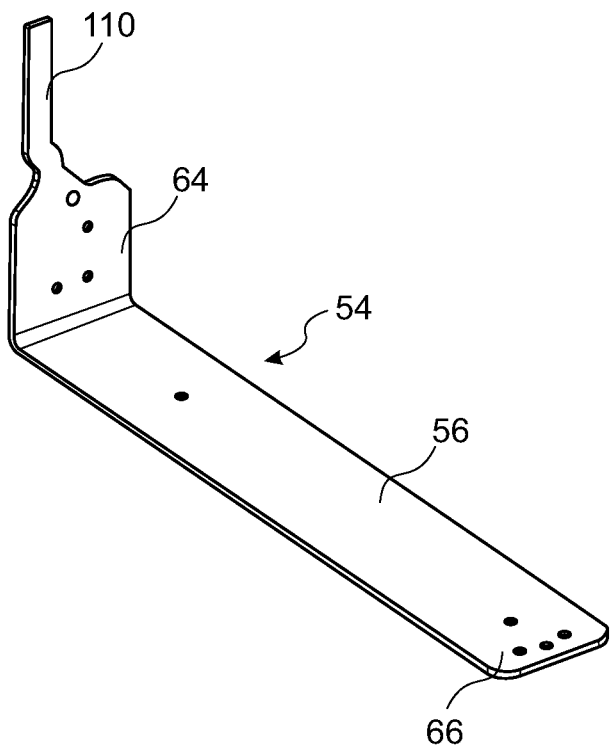
FIG. 7 shows perspective views of a "cross" collimator shutter in accordance with an embodiment of the invention.

The main x-ray attenuating portions 56 of the two cross shutters 54 lie in the same plane, parallel to the bottom surface 24 of the collimator device 20, and move in synchronisation with one another towards and away from each other to control the size of a cross gap 62 between the cross shutters 54, as shown in FIGS. 6 and 7.

As shown in FIG. 7, the main x-ray attenuating portions 56 of the two cross shutters 54 include a first mounting portion or cross vertical mounting portion 64 at a first end thereof and a second mounting portion or cross horizontal mounting portion 66 at a second end thereof. A first guide rail or cross target guide rail 70 (FIGS. 5 and 13) extends adjacent to the left side panel 30 and the first mounting member 64 is slidably mounted with respect to the first guide rail 70. A second guide rail or cross non-target guide rail (not shown) extends adjacent to the right side panel 32 and the second mounting 66 member is slidably mounted to the second guide rail.

Figure 4:
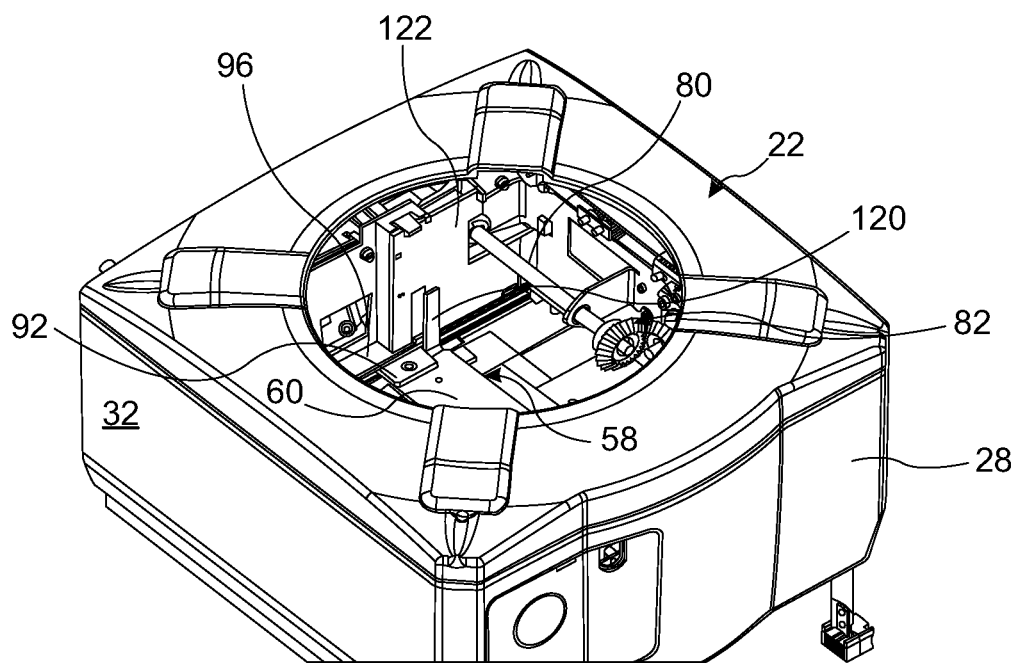
FIG. 4 shows an overhead rear perspective view of the x-ray beam control apparatus of FIG. 2 with part of the top cover removed.

The movement of the two cross shutters 54 is controlled by cross shutter controller 80 (FIGS. 2, 4, and 5) extending to the front panel 26 to a cross shutter controller knob 79. A first driving mechanism or cross driving mechanism (e.g., a gear arrangement) 82 may be provided to convert manual movement of the cross shutter controller 80 to synchronised movement of the two cross shutters 54 to be closer together or further apart. The cross driving mechanism 82 may be of a known design and will not be described further here.

Figure 8:
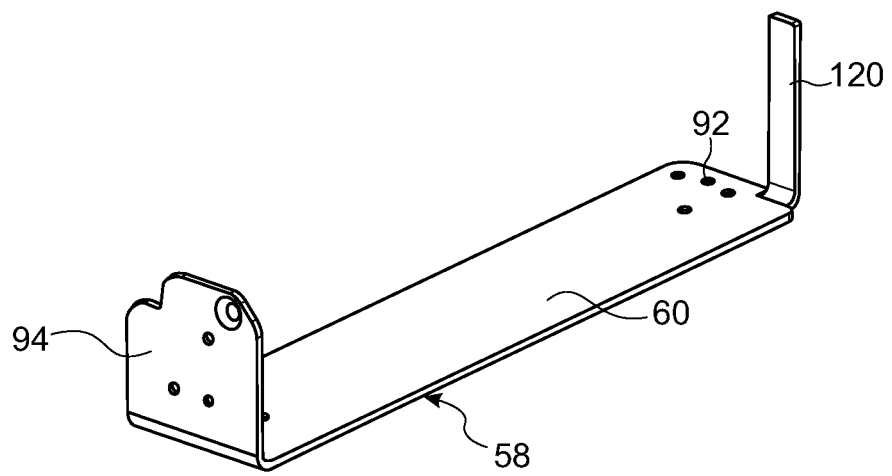
FIG. 8 shows perspective views of a "long" collimator shutter in accordance with an embodiment of the invention.
Figure 11:
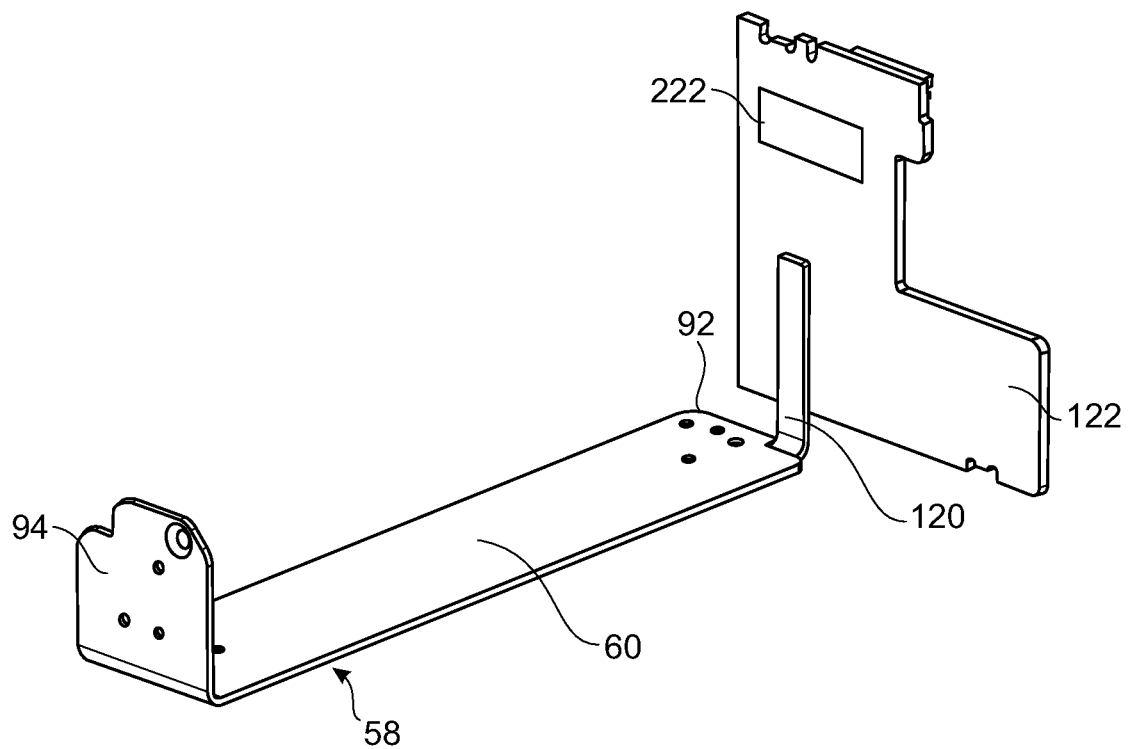
FIG. 11 shows a long collimator shutter and a movement sensor in accordance with an embodiment of the invention.
Figure 12:
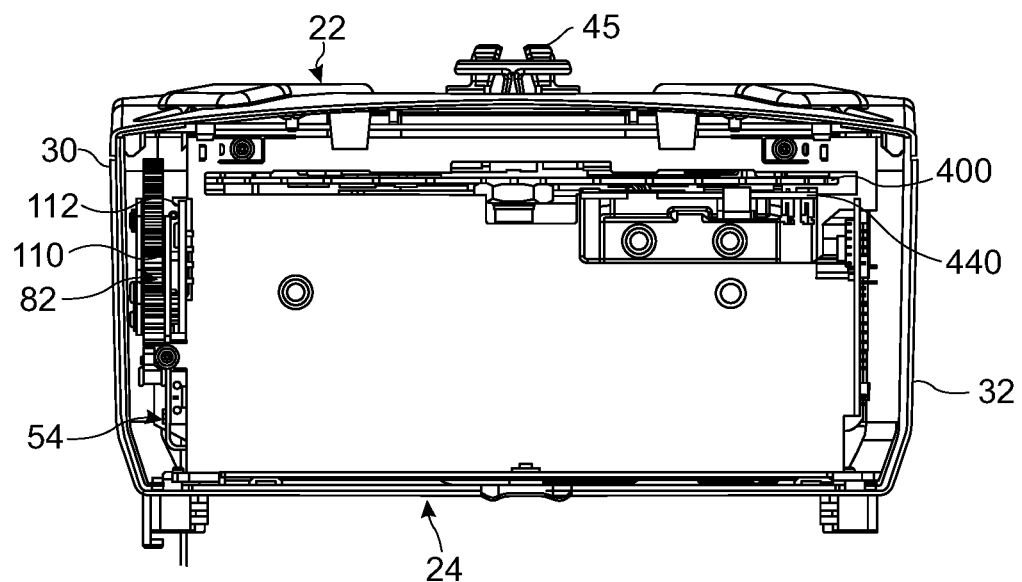
FIG. 12 shows a simplified front view of the x-ray beam control apparatus of FIG. 2 with the front panel removed.
Figure 14:
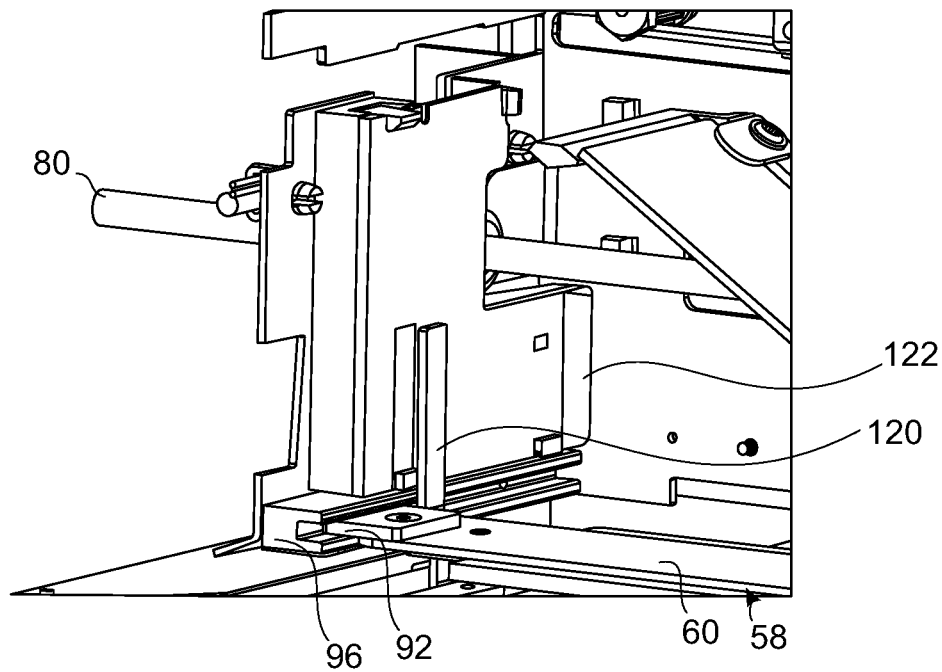
FIG. 14 shows a detailed view of a long shutter and sensor in the casing of the x-ray beam control apparatus of FIG. 2.
Figure 15:
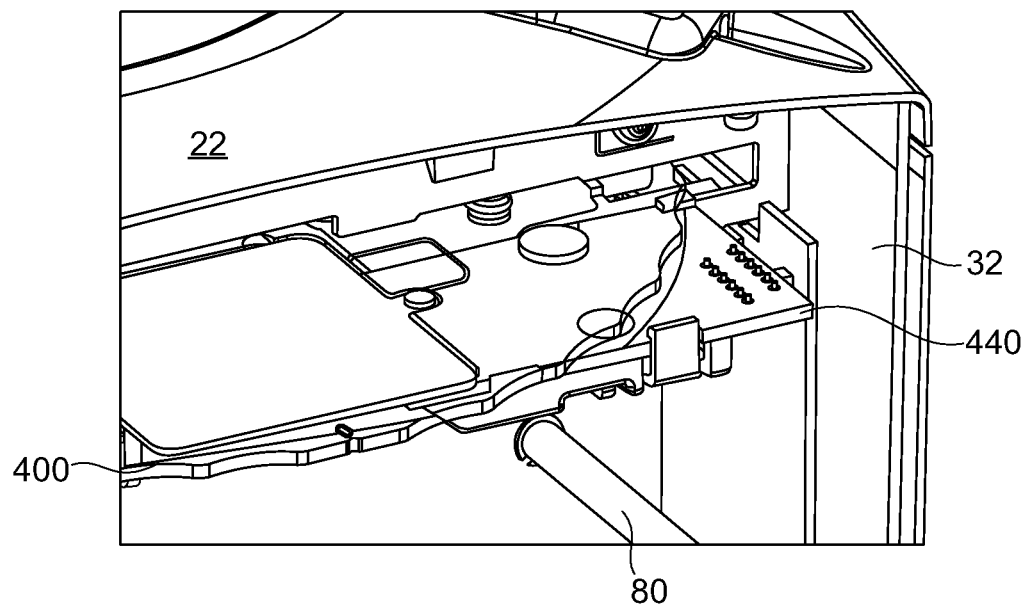
FIG. 15 shows a detailed view of a filter assembly and sensor in the casing of the x-ray beam control apparatus of FIG. 2.

Similarly, the main x-ray attenuating portions 60 of the two long shutters 58 lie in the same plane, parallel to the bottom surface 24 of the collimator device 20, and move in synchronisation with one another towards and away from each other to control the size of a long gap 90 between the long shutters 58, as illustrated in FIG. 6. As shown in FIGS. 8 and 11, the main x-ray attenuating portions 60 of the two long shutters 58 include a first mounting portion or long horizontal mounting portion 92 at a first end or long target end thereof and a second mounting portion or long vertical mounting portion 94 at a second end or long non-target end thereof. As shown in FIG. 14, A third guide rail or long target guide rail 96 extends adjacent to the front panel 26 and the first mounting portion 92 is slidably mounted with respect to the third guide rail 96. A fourth guide rail or long non-target guide rail (not shown) extends adjacent to the rear panel 28 and the second mounting 94 member is slidably mounted with respect to the fourth guide rail.

The movement of the two long shutters 58 is controlled by long shutter controller 100 extending to the front panel 26 to a long shutter controller knob 99. A second driving mechanism or long driving mechanism (not shown), e.g., a gear arrangement, may be provided to convert manual movement of the long shutter controller 100 (FIGS. 2 and 3) to movement of the long shutters 58 to be closer together or further apart. The long driving mechanism may be of a known design and will not be described further here.

By moving the cross shutters 54 and the orthogonal long shutters 58, the size of a rectangular opening 102 (see FIG. 6) can be controlled which in turn controls the passage of x-rays from the x-ray tube 10 through the collimator device 10 and thereby affects the x-ray dose received by e.g. a patient.

Such an arrangement of long and cross shutters is provided in the Optica 10 series and Optica 20 series available from Varex Imaging Corporation.

Figure 9:
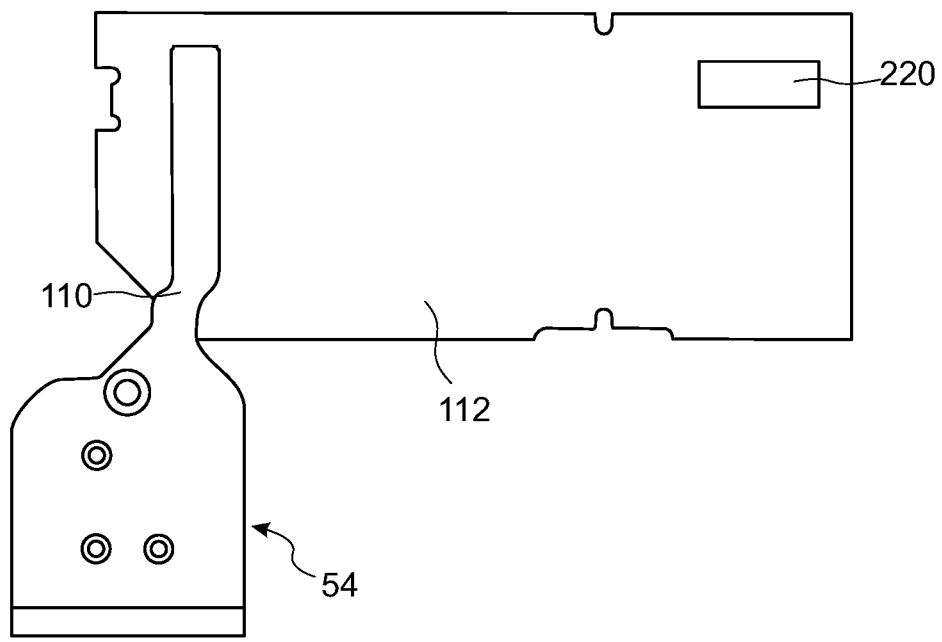
FIGS. 9 and 10 show a cross collimator shutter and a movement sensor in accordance with an embodiment of the invention.
Figure 10:
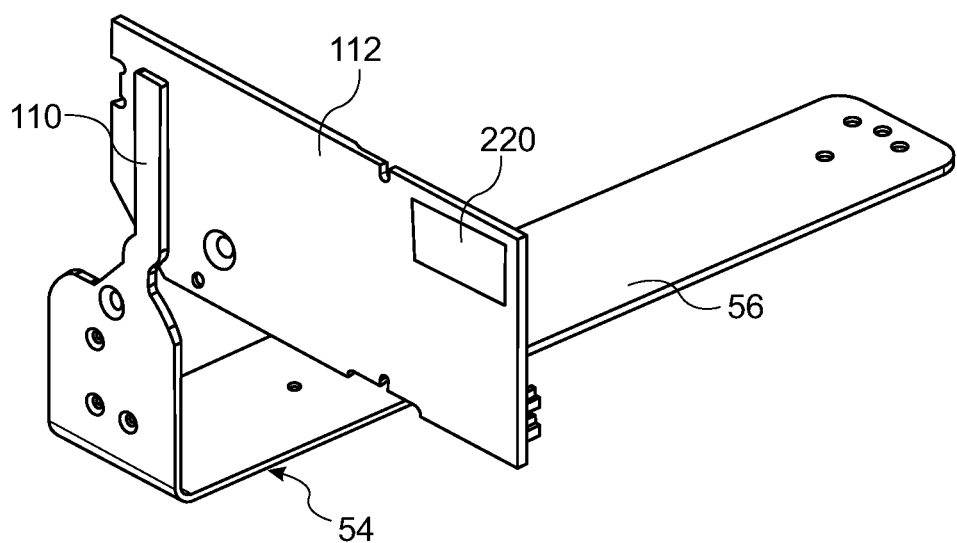

In one embodiment at least one of the cross shutters 54 or its cross driving mechanism 82 is provided with a cross target 110 (e.g., formed of metal or other electrically conductive material), as shown in FIGS. 7, 9 and 10. The cross target 110 can extend from the cross vertical mounting portion 64 of one of the cross shutters 54 (e.g., closest to the front panel). In the embodiment shown, the cross shutter 54 nearest the front panel 26 is provided with a cross target 110 at the end thereof adjacent to the left side panel 30. The cross target 110 may be integrally formed with the cross shutter 54 or may be coupled to the cross shutter 54 (or its driving mechanism 82) so that it moves with the cross shutter 54. The cross target 110 has a range of movement that corresponds to the range of movement of the cross shutter 54. The cross target 110 can be perpendicular to the main x-ray attenuating portion 56 of the cross shutter 54.

Figure 13:
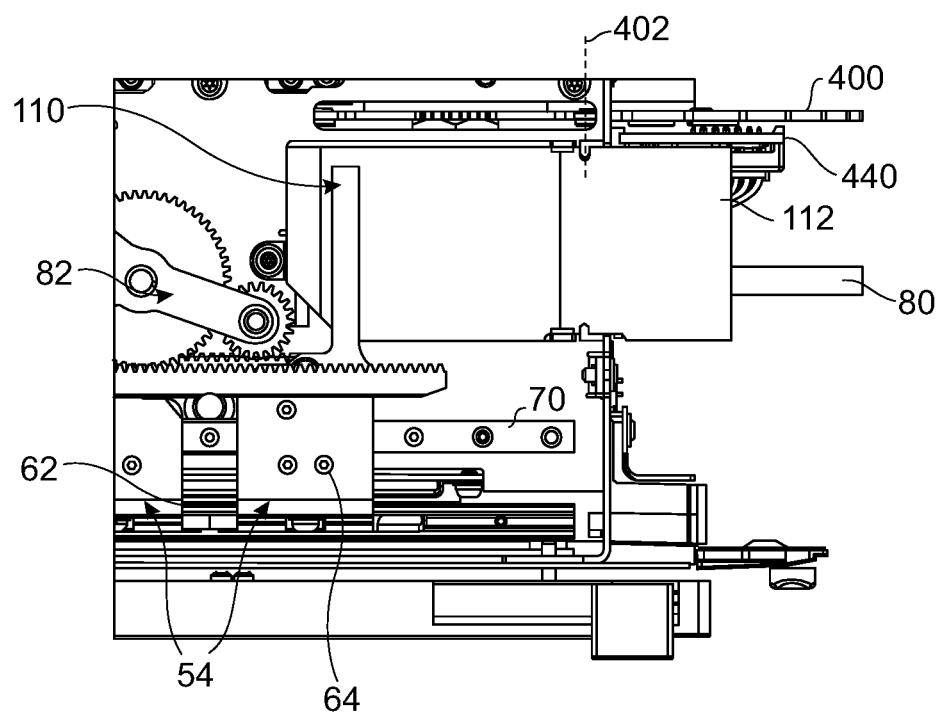
FIG. 13 shows a simplified left side view of the x-ray beam control apparatus of FIG. 2 with a side panel removed.

As illustrated in FIGS. 10 and 13, a cross position sensor 112 is located next to but spaced apart from the cross target 110 and has a length at least corresponding to the range of movement of the cross target 110. The cross position sensor 112 is in a fixed position relative to the collimator device 20 case. The cross position sensor 112 generates a signal indicative of the position of the cross target 110 and which is used for determining the position of the cross shutters 54.

In an example, if a part the cross driving mechanism 84 is provided with the cross target 110, such that the cross target 110 moves with the cross shutters 54, this movement can be detected by an appropriately located cross position sensor 112 to generate a signal indicative of the position of the cross target 110 that is used for determining the position of the cross shutters 54. In an example, the cross position sensor 112 is fixed (to a frame of the collimator device 20) relative to the movable cross target 110.

In the arrangement shown, only one of the cross shutters 54 is provided with a cross target. Given the symmetry in position and movement of the cross shutters, a single cross target can be sufficient to indicate the position of both the cross shutters, as the two cross shutters move in synchronisation (due to the operating characteristics of the driving mechanism). The position of the second cross shutter (without the target 110) can be deduced from the position of the first cross shutter (with the target 110).

In an alternative arrangement, each cross shutter may be provided with a target and cross position sensor. Such an arrangement is particularly suitable when the cross shutters move independently, rather than in synchronisation.

In one embodiment, as illustrated in FIGS. 8 and 11, at least one of the long shutters 58 or its long driving mechanism is provided with a long target 120 (e.g., formed of metal or other electrically conductive material). In the embodiment shown, the long shutter 58 nearest the left side panel 30 is provided with a long target 120 at the end thereof adjacent to the front panel 26. The long target 120 may be integrally formed with the long shutter 58 or may be coupled to the long shutter 58 (or its driving mechanism) so that it moves with the long shutter 58. The long target 110 can extend vertical from the long horizontal mounting portion 92 opposite the long vertical mounting portion 94 of one of the long shutters (e.g., closest to the left panel). The long target 120 has a range of movement that corresponds to the range of movement of the long shutter 58. The long target 120 can be perpendicular to the main x-ray attenuating portion 60 of the long shutter 58.

As shown in FIGS. 11 and 14, a long position sensor 122 is located next to but spaced apart from the long target 120 and has a length at least corresponding to the range of movement of the long target 120. The long position sensor 122 is in a fixed position relative to the collimator device 20 case. The long position sensor 122 generates a signal indicative of the position of the long target 120 that is used for determining the position of the long shutters 58.

In an example, if a part the long shutter's 58 driving mechanism is provided with the long target 120, such that the long target 120 moves with the long shutters 58, this movement can be detected by an appropriately located long position sensor 122 to generate a signal indicative of the position of the long target 120 that is used for determining the position of the long shutters 58. In an example, the long position sensor 122 is fixed (to a frame of the collimator device 20) relative to the movable long target 120.

In the arrangement shown, only one of the long shutters 58 is provided with a long target. Given the symmetry in position and movement of the long shutters, a single long target can be sufficient to indicate the position of both the long shutters, as the two long shutters move in synchronisation (due to the operating characteristics of the driving mechanism). The position of the second long shutter (without the target 120) can be deduced from the position of the first long shutter (with the target 120).

In an alternative arrangement, each long shutter may be provided with a target and long position sensor. Such an arrangement is particularly suitable when the long shutters move independently, rather than in synchronisation.

Figure 16:
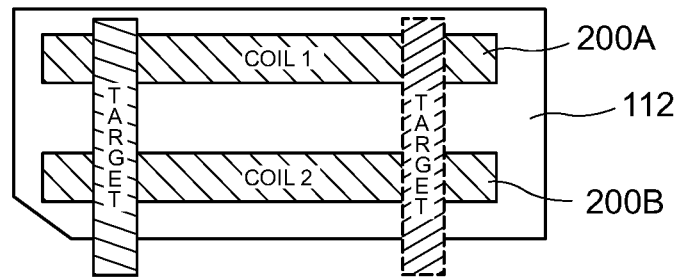
FIG. 16 shows schematically some components of the cross sensor (the long sensor having similar components)

The cross position sensor 112 and the long position sensor 122 may have similarities in their designs. The position sensor 112, 122 may comprise a set of asymmetrical electrical coils (L) 200A, 200B (see FIGS. 16 and 17). The asymmetrical electrical coils (L) 200A, 200B may be linear, rectangular and/or longitudinal. In an example, each of these coils 200A, 200B can be connected in parallel with a capacitor (C) 202 to form a self-resonating LC-tank circuit 204, as illustrated in FIG. 18. Depending on the position of the associated target 110, 120 the self-resonance frequency of the LC-tank circuit 204 will change. By triggering the LC-tank circuit 204 and measuring the frequency, the actual position of the associated shutter 54, 58 can be determined at high accuracy, which may be more accurate than conventional Hall-effect sensors that use magnets.

The LC-tank circuits 204 may be driven and measured by using an inductance to digital converter (LDC).

The LC-tanks circuits 204 may be provided on a printed circuit board assembly (PCBA or PCB) of the cross position sensor 112 and the long position sensor 122.

Figure 17:
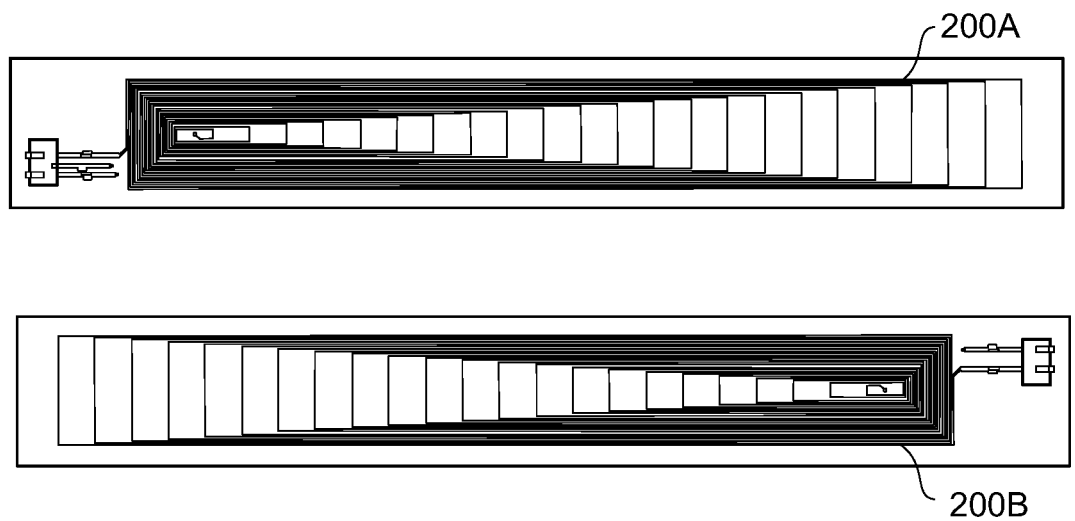
FIG. 17 shows the arrangement of asymmetrical coils used in the sensors.
Figure 18:
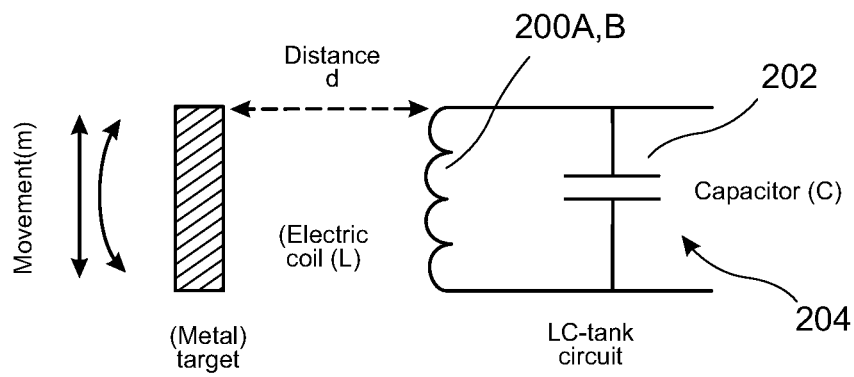
FIG. 18 shown an LC-tank circuit.

As shown in FIG. 17, the set of asymmetric coils of each position sensor 112, 122 may comprise two similar longitudinal asymmetrical coils 200A, 200B which are oriented in opposite directions. The oppositely oriented asymmetrical coils 200A, 200B may be used to countereffect errors due several physical distortions, for example, but not limited to target distance, temperature, actual physical material properties, and the like.

The asymmetry of the coils 200A, 200B is provided by in the illustrated example by the windings of the coils being increasingly spaced apart along the length of the coils. Other asymmetric coil configurations may be used. Each asymmetric coil 200A, 200B is configured to produce a non-homogeneous alternating current (AC) magnetic field. The magnetic field produced is stronger at one end of the coil than the other, such as the winding of the coils with closer spacing. A non-homogeneous AC magnetic field, such as magnetic field stronger at one end of the coil than the other, could be provided by arrangements other than asymmetric coils.

Using a set of two similar but oppositely oriented asymmetrical coils 200A, 200B allows for measuring the differential result between the two asymmetrical coils 200A, 200B to obtain inherent compensation of adverse effects of environmental parameters on the measurement results, which can provide greater accuracy. This differential result will be largely dependent on the position of the target 110, 120 along the length of the set of asymmetrical coils 200A, 200B.

The outputs of each LC-tank circuit 204 of may be read by an Inductance to Digital Converter (LDC) or other similar circuit for performing inductive sensing, which may be provided on the same PCBA as the LC-tank circuit 204. The LDC senses changes in the inductance of each asymmetric coil 200A, 200B which are caused by movement of the associated target 110 or 120. The change in inductance is caused by eddy currents generated in the associated target 110 or 120 by the coil 200A, 200B. The eddy currents generate a secondary magnetic field that opposes the magnetic field of the coil 200A, 200B, which causes a shift in the measured inductance. The LDC may output a code that is indicative of the measured inductance. Hereinafter the term "LDC output" will be used to refer to the output of the LDC.

Figure 19:
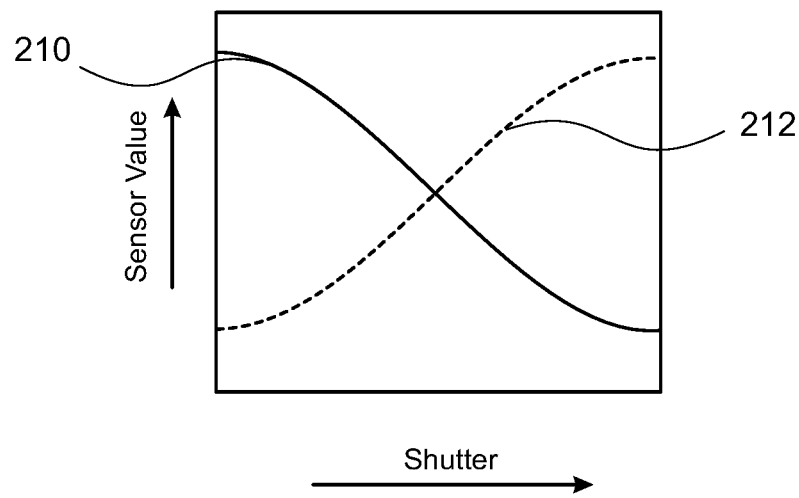
FIG. 19 shows example sensor outputs.

The LDC output of coil 200A is shown at 210 in FIG. 19 and the LDC output of coil 200B is shown at 212 in this Figure. The vertical axis is the LDC output value (on a linear scale) and the horizontal axis is the shutter position (on a linear scale), as a measure of distance (from a minimum spacing to a maximum spacing). The LDC outputs 210, 212 vary linearly with movement of the associated target 110 or 120 over a proportion (e.g., 60%) of the coil 200A, 200B length. However, as shown, at one or both ends of the coil length the LDC output 210, 212 may vary non-linearly with movement of the target 110 or 120. Advantageously, the LDC output 210, 212 is linearised so that the linearised LDC output varies linearly with the position of the target 110 or 120. For example, the LDC output may be linearised by translating the LDC output 210, 212 to target 110 or 120 position by calculating a best-fit curve through the output response, which for any LDC output value, allows the target position to be calculated. Alternatively, the LDC output can be translated to target position by employing a look-up table that maps LDC output values to target position.

The distance between the sensor 112, 122 and the target 110, 120 (the "z-distance") can have a significant effect of the measured inductance of the asymmetrical coils 200A, 200B and consequently also on the LDC output.

As described later in steps 3, 4 and 5 of the flowchart of FIG. 21, the z-distance may be calculated using the signals from the asymmetrical coils 200A, 200B. Alternatively, or additionally, as described later in relation to FIG. 22, one or more (e.g. a set of two) symmetrical (e.g., rectangular) coils in parallel to the asymmetrical coils 200A,B may be used to enable the measurement the z-distance of the target 110, 120 to the sensor 112, 122. If the z-distance is known, a look-up table may be used to adjust the LDC output to compensate for changes the LDC output due to the z-distance (so that the compensated LDC output does not vary with z-distance).

The LDC output also varies in dependence on the temperature of environment in which the sensor is located. The LDC output for any given target position may reduce as temperature increases. The temperature within the collimator can be influenced, for example, by the following sources: the environmental temperature; the X-ray tube, to which the collimator is mounted, being heated by X-ray production; and internal components of the collimator (electronics, light source). A temperature sensor to measure this temperature may be provided. The temperature sensor may be provided at a suitable location. For example, a first temperature sensor 220 may be provided on the long sensor 112 and a second temperature sensor 222 may be provided on the cross sensor 122. A look-up table may be used to adjust the LDC output to compensate for changes the LDC output due to the temperature (so that the compensated LDC output does not vary with temperature).

Figure 20:
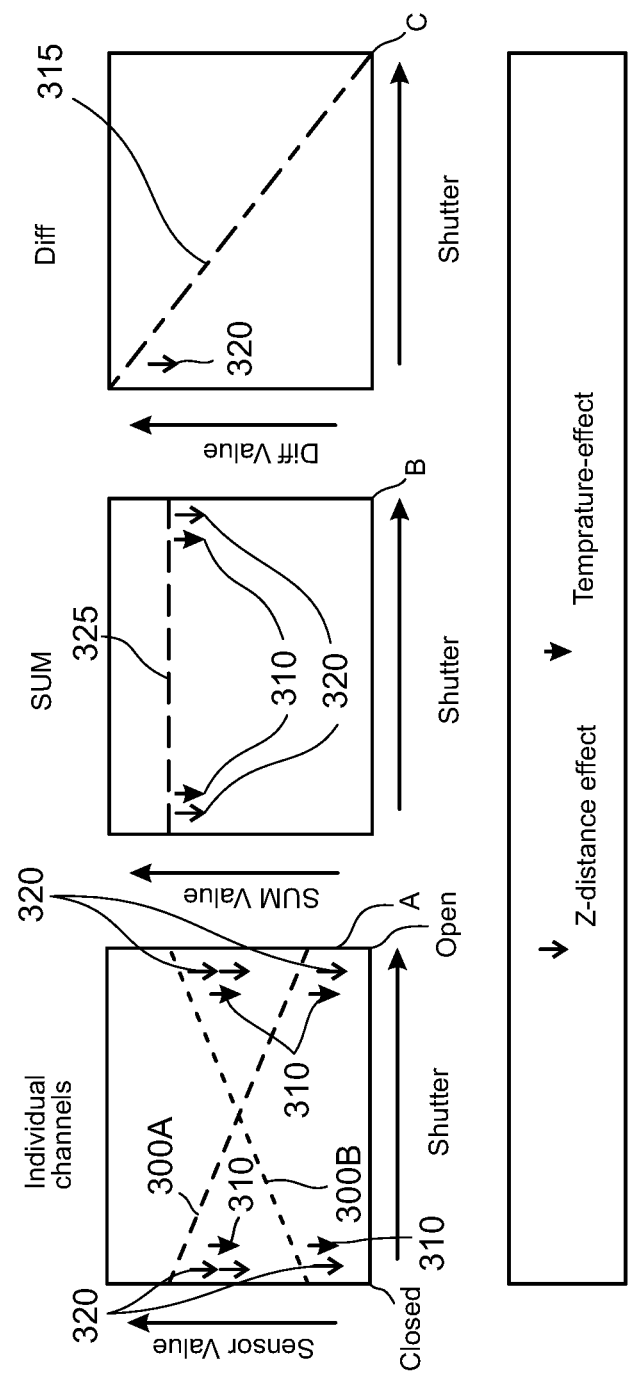
FIG. 20 shows the SUM and difference values calculated in accordance with an embodiment of the invention.

An algorithm for position detection of the position of the cross target 110 and the long target 120 will now be described with reference to the FIGS. 20A, B and C and the flowchart of FIG. 21. In the following explanation, position detection of the cross target 110 is discussed, but the same principles and procedure may be used for position detection of the long target 120 and will not be repeated. The detected positions of the cross target 110 and the long target 120 can be used to calculate the x-ray dose received by a patient, and so the positions of the cross target 110 and the long target 120 may be detected at any time while the collimator device 20 is in use and the x-ray dose needs to be calculated.

As mentioned above, the cross sensor 112 has two asymmetrical, oppositely oriented, inductive coils 200A, 200B (each read out by an LC-tank circuit 204 of the cross sensor 112) which detects the movement of the cross target 110 the cross shutter 54 and a temperature sensor 220 may be provided for temperature measurement. The LC-tank circuit 204 outputs are converted to a digital value by an LDC converter.

At step 1 of the flowchart the raw data (e.g., discrete digital signal) from the LDC converters associated with each of the asymmetrical coils 200A, 200B is obtained.

An example output of the LDC converter output value for asymmetrical coil 200A of the cross sensor 112 is shown at 300A in FIG. 20A for different positions of the cross shutter 54 as the cross shutter 54 moves from a closed position (at the left of FIG. 20A) to the most open position (at the right of FIG. 20A), corresponding to the shutter 54 moving towards the front panel 24 of the collimator device 20. As before, the vertical axis is the LDC output value and the horizontal axis is the shutter position.

An example output of the LDC converter output value for asymmetrical coil 200B of the cross sensor 112 is shown at 300B in FIG. 20A, again for different positions of the cross shutter 54 as it moves from a closed position (at the left of FIG. 20A) to the most open position (at the right of FIG. 20A), corresponding to the shutter 54 moving towards the front panel 24 of the collimator device 20.

The LDC converter output values 300A and 300B are shown as straight lines for simplicity. However, as mentioned earlier, the output values may vary non-linearly with distance, so in practice the lines may not be linear (such as shown in FIG. 19).

Due to the opposite orientations of the asymmetrical coils 200A, 200B the maximum and minimum LDC converter outputs for each coil occur opposite ends of the range of movement of the shutter 54.

If the temperature increases, the LDC converter output values move towards the direction of the arrows 310 (with closed filled arrow heads).

At optional step 2, using the onboard temperature sensor 220 this temperature effect will be compensated. For example, this can be done using a lookup table as described above.

At optional step 3, the approximate shutter 54 position is calculated as illustrated in FIG. 20C. This is done based on the difference between the LDC converter output values 300A and 300B (e.g., by subtracting LDC converter output value 300A from 300B). As the LDC converter output values 300A and 300B vary non-linearly with shutter 54 position, the difference between the LDC converter output values 300A and 300B may also vary non-linearly. The non-linearity of the difference value at any given position of the shutter 54 can be estimated or determined empirically and can be linearised using a lookup table or best-fit curve, using the principles described above regarding linearising the LDC converter output values. The linearised difference value for the range of movement of the shutter 54 is shown at 315 in FIG. 20C. As can be seen, the linearised difference value is different for each position of the shutter 54 and so indicates the shutter position.

As mentioned previously, the distance between the sensor 112 and the target 110 of the shutter 54 (the z-distance) has a significant effect of the measured inductance of the coils 200A, 200B and consequently also on the LDC output. If the z-distance of the target 54 increases (e.g., more distance between the PCBA and the target due to mechanical play), the sensor curves shown in FIG. 20 move towards the direction of the open-headed arrows 320, and there is less difference between minimum and maximum LDC output values. The maximum LDC output values decrease relatively more with an increase in z-distance (as indicated by the double open-headed arrows) than the minimum LDC output values (as indicated by the single open-headed arrows.

At optional step 4 the SUM of the LDC converter output values 300A and 300B, as illustrated in FIG. 20B, after temperature correction at step 2, is calculated (by adding LDC temperature corrected converter output value 300A to 300B). The SUM value for the range of movement of the shutter 54 is shown at 325. As indicated by the open-headed arrows 320, the SUM value 325 varies (reduces) as the z-distance increases. The z-distance corresponding to any given SUM value 325 of the shutter 54 can be estimated or determined empirically and can be stored in a lookup table. Using the SUM value 325 and the lookup table, the z-distance can be calculated.

At optional step 5 the calculated z-distance is used to correct the approximate shutter 54 position calculated at step 3 for any effect of z-distance on the position calculation.

At step 6 the cross shutter 54 opening 62 is calculated. The calculation may optionally be based on the temperature and/or z-position corrected data. The shutter opening value may be further corrected at this step for any remaining effects of non-linearity of the LDC output 210.

Figure 21:
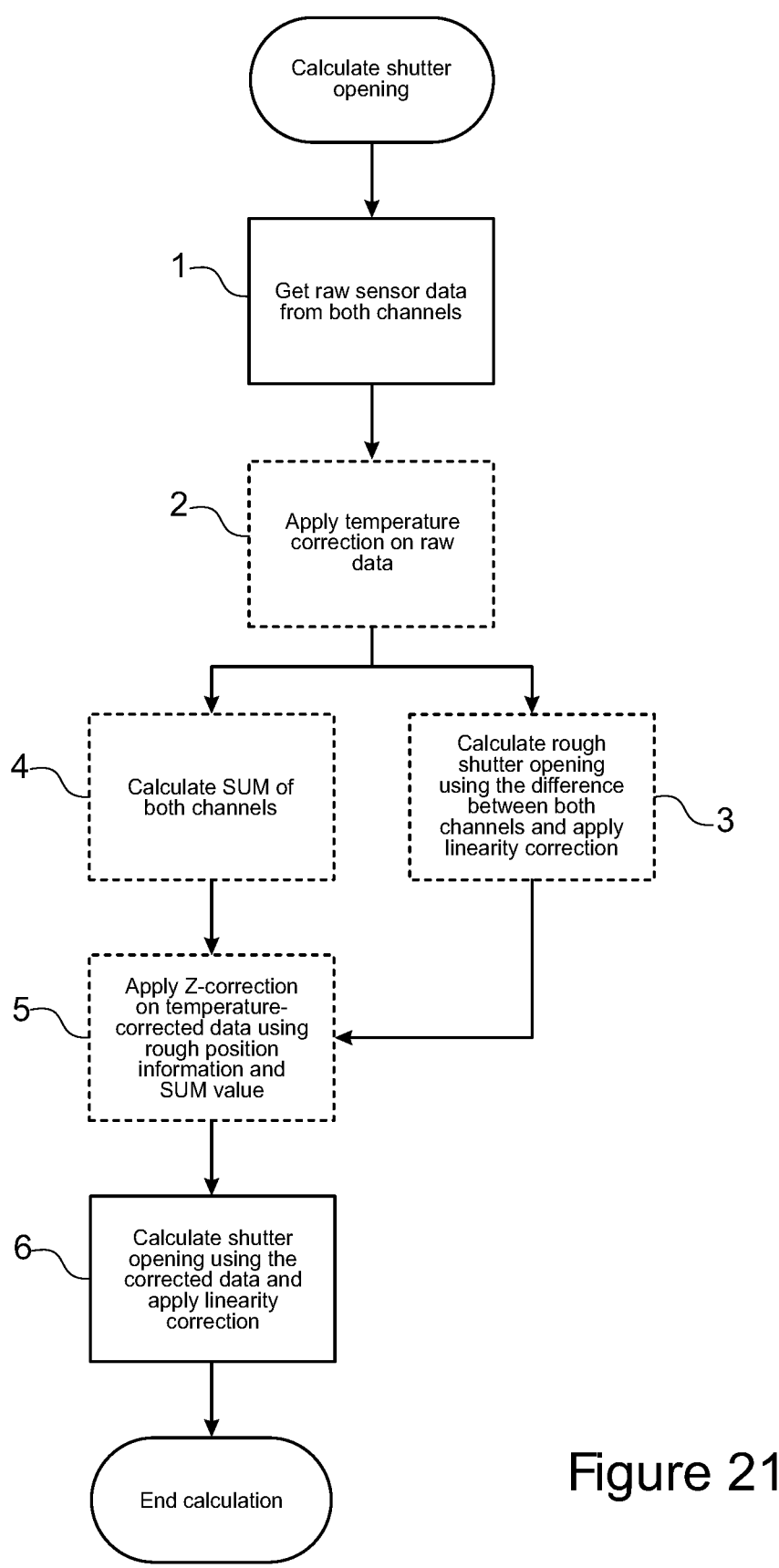
FIG. 21 shows a flow chart of steps for calculating collimator shutter position.

The algorithm shown in the flowchart of FIG. 21 includes three different corrections that can be made to the raw data from the LDC converters associated with each of the asymmetrical coils 200A, 200B: (1) temperature correction, (2) non-linearity correction on position sensor, and (3) z-correction. Any or all of these corrections may be included or omitted from the algorithm, in dependence on the corrections required in the circumstances.

Figure 22:
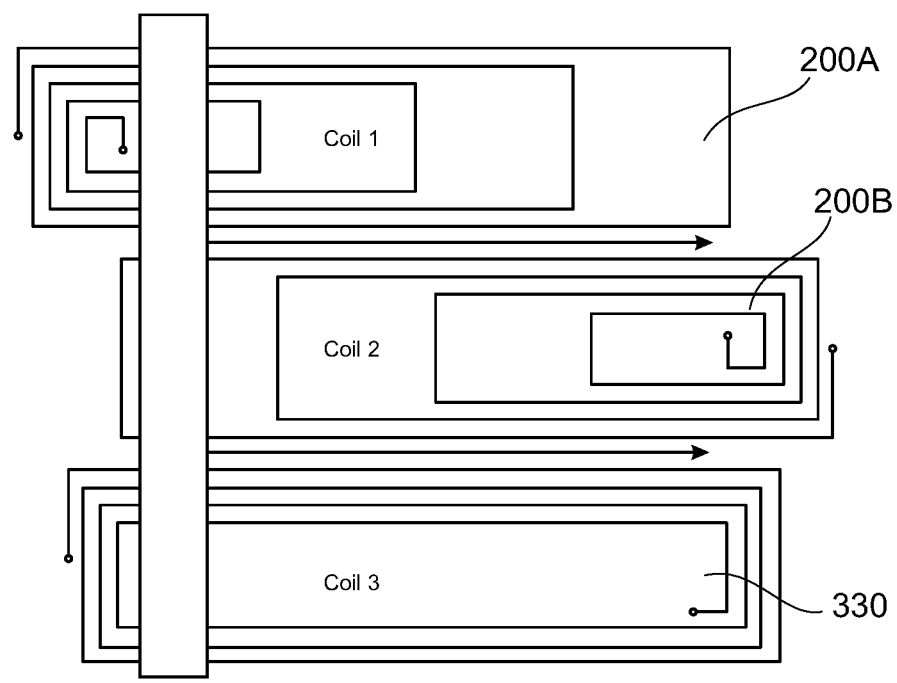
FIG. 22 shows the arrangement of a symmetrical coil on a sensor, in addition to the asymmetrical coils.

As mentioned above, the long shutter 58 opening 90 may be calculated in a similar manner. Together, the size of the two openings 62 and 90 allow the size of the rectangular x-ray opening 102 to be calculated for the purposes of determining the x-ray dose. The calculated the size of the rectangular x-ray opening 102 can be used to calculate the X-ray dose received by a patient FIG. 22 shows the arrangement of a symmetrical coil 330 on a sensor, in addition to the asymmetrical coils 200A, 200B.

In one embodiment, an additional one or more (e.g. a set of two) symmetrical (e.g., rectangular) coils in parallel to the asymmetrical coils 200A,B may be provided allow the measurement the z-distance of the target to the sensor. These one or more coils are also part of an LC-tank circuit and can be connected to an LDC device to output a value that varies with the measured inductance. As explained above, the LDC device output will reduce as the z-distance increases. By using one or more symmetrical coils with a differential measurement inherent compensation of adverse effects of environmental parameters can be achieved. The measurement result of the symmetrical coil(s) can be used to compensate for errors in the linear shutter 54 measurement results caused by variation in distance of the target 110 to the set of asymmetrical coils 200A,B, thereby improving the measurement accuracy in case the mechanical tolerances in the z-distance between the target and the asymmetrical coils 200A, 200B are too large to be compensated by the SUM value 325. A two-dimensional (2D) look-up table can provide linearisation of the LDC output and adjust the LDC output to compensate for changes the measured values due to the distance between the target 110 and the sensor 210 (so that the compensated LDC output does not vary with z-distance). The look-up table may map LDC output values from the asymmetrical coils 200A, 200B to target position to provide linearisation of the LDC output. The look-up table may map LDC output values from the symmetrical coils to target position to target position to compensate for z-distance.

Also, the one or more symmetrical coils may be used in addition to, or as an alternative to using the SUM value 325 to calculate the z-distance. Additional symmetrical coil(s) may not be necessary, and symmetrical coil(s) may be used if they provide an output that gives an output indicative of z-distance.

In the embodiment described both the cross shutters 54 and the long shutters 58 are moveable. In an alternative arrangement, only the cross shutters 54 are moveable and the long shutters are fixed (or vice versa). Also, in the embodiment, both the cross shutters 54 move and both the cross shutters 58 move; however, only one of the cross shutters 54 and/or only one of the long shutters 58 may move (with the other being stationary) or both the cross shutters 54 and/or both the long shutters 58 may move independently The sensing arrangement and x-ray opening calculation procedure described above can be modified to work with these different shutter arrangements (and other shutter arrangements).

In addition to the inherent x-ray filtering provided by the collimator device 20 as previously discussed, an additional x-ray filtering is provided by a filter disc 400, as illustrated in FIGS. 5, 12-13 and 23-24. The filter disc 400 is mounted, in this embodiment, just below the top surface 22 of the collimator device 20 and extends in a plane generally parallel to the top surface 22. The filter disc 400 is mounted for rotation about an axis 402 (FIG. 13) that extends generally parallel to the front plate 24 of the collimator device 20 and located between the centre of the collimator device 20 and the front plate 24. As illustrated in FIG. 2, the filter disc 400 extends through a slot in the front panel 26 so that it can be manually rotated by an operator to select the filter disc position within the collimator device 20.

The filter disc 400 in this embodiment has four discrete filter regions 410A, B, C and D, each of which provides a different amount of x-ray filtering (or attenuation) when the filter at the filter region 410A, B, C or D is moved into the path of the x-rays from the x-ray tube 10 at the central region of the collimator device 20. For example, at filter region 410A no filtering of the x-rays is provided (e.g., there is an aperture in the filter disc 400 at filter region 410A). At filter region 410B a first filter may be provided for providing a low level of x-ray filtering (or attenuation). At filter region 410D a second filter may be provided for providing a high level of x-ray filtering (or attenuation). At filter region 410C a third filter may be provided for providing an intermediate level of x-ray filtering (or attenuation), between the high and low level. The filtering may be provided by copper or aluminium plates of a selected thickness to provide the desired level of x-ray filtering (or attenuation). These aspects of additional filtering are similar to those provided on the Varex Optica 10 series and Optica 20 series devices and will not be described further. The four discrete filter regions 410A, B, C and D refer to four valid or correct filter positions where anything in between these positions is an invalid or incorrect filter position or fifth filter position where filter values are undefined. The filter disc 400 may have indexing with a resilient member to assist in positioning the filter disc 400 into the discrete filter regions 410A, B, C and D.

Figure 23:
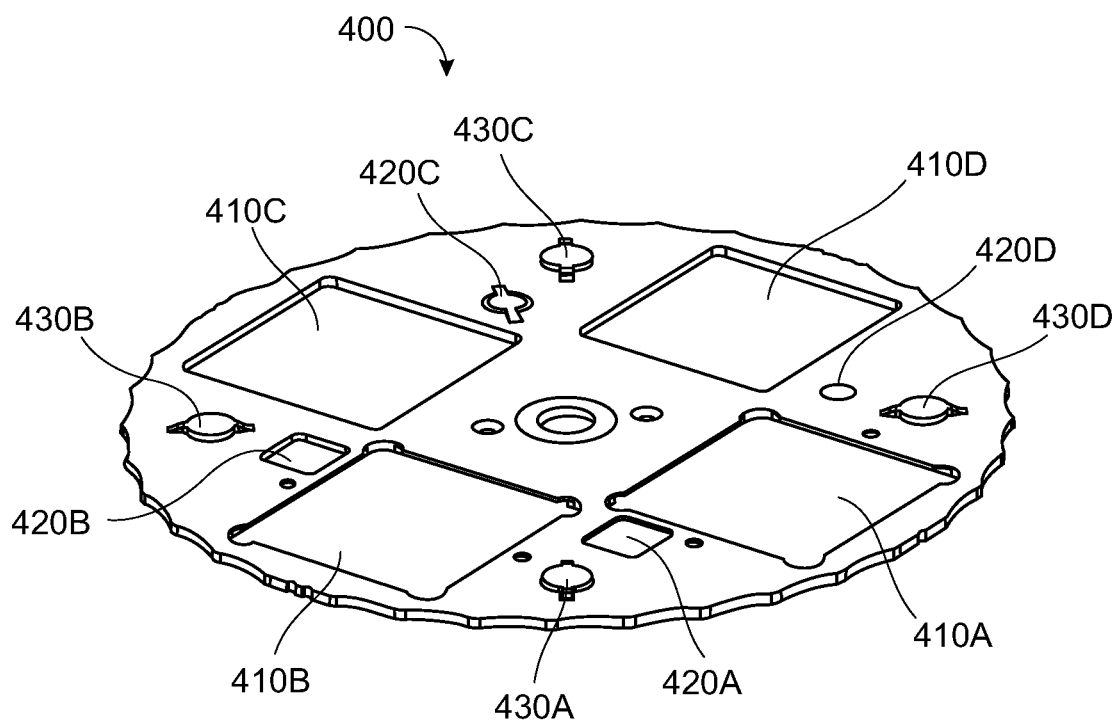
FIG. 23 shows a perspective view of the underside an x-ray filter assembly in accordance with an embodiment of the invention.

According to an embodiment, as best shown in FIG. 23, the filter disc 400 is provided with a filter identifier portion 420A, B, C or D associated with each of the filter regions 410A, B, C and D. The filter identifier portion 420A, B, C or D indicates which filter is aligned with the collimator opening or shutters. Each of the filter identifier portions 420A, B, C and D is located in a same location relative to its filter region 410A, B, C and D on the filter disc 400 so that the filter identifier portion 420A, B, C or D can be detected by a detector fixed relative to the collimator device 20 body. The filter identifier portions 420A, B, C and D each have a different electromagnetic property—for example by each extending a different height from the underside of the filter disc 400 (or an amount recessed into the disc surface). The filter identifier portions 420A, B, C and D may each have a different electromagnetic property by some other arrangement, such as being formed of different materials. In an embodiment, the filter identifier portions 420A, B, C and D do not have to be formed on the filter disc 400, and may be separate from but move with the filter disc 400; for example, the filter identifier portions 420A, B, C and D may move with a mechanism for rotating the filter disc 400.

According to this embodiment, the filter disc 400 is also provided with a filter reference portion 430A, B, C or D associated with each of the filter regions 410A, B, C and D. The filter identifier portion 420A, B, C or D indicates that the filter is properly aligned with the collimator opening or shutters. Each of the filter reference portions 430A, B, C and D is located in a same location relative to its filter region 410A, B, C and D on the filter disc 400 so that the filter reference portion 430A, B, C or D can be detected by a detector fixed relative to the collimator device 20 body. The filter reference portions 430A, B, C and D may each have the same electromagnetic property—for example by each extending a same amount from the underside of the filter disc 400 (or an amount recessed into the disc surface). The filter reference portions 430A, B, C and D may be provided by some other arrangement, such as being formed from a different material to that of the filter disc 400. The filter reference portions 430A, B, C and D do not have to be formed on the filter disc 400, and may be separate from but move with the filter disc 400; for example, the filter reference portions 430A, B, C and D may move with a mechanism for rotating the filter disc 400.

Figure 24:
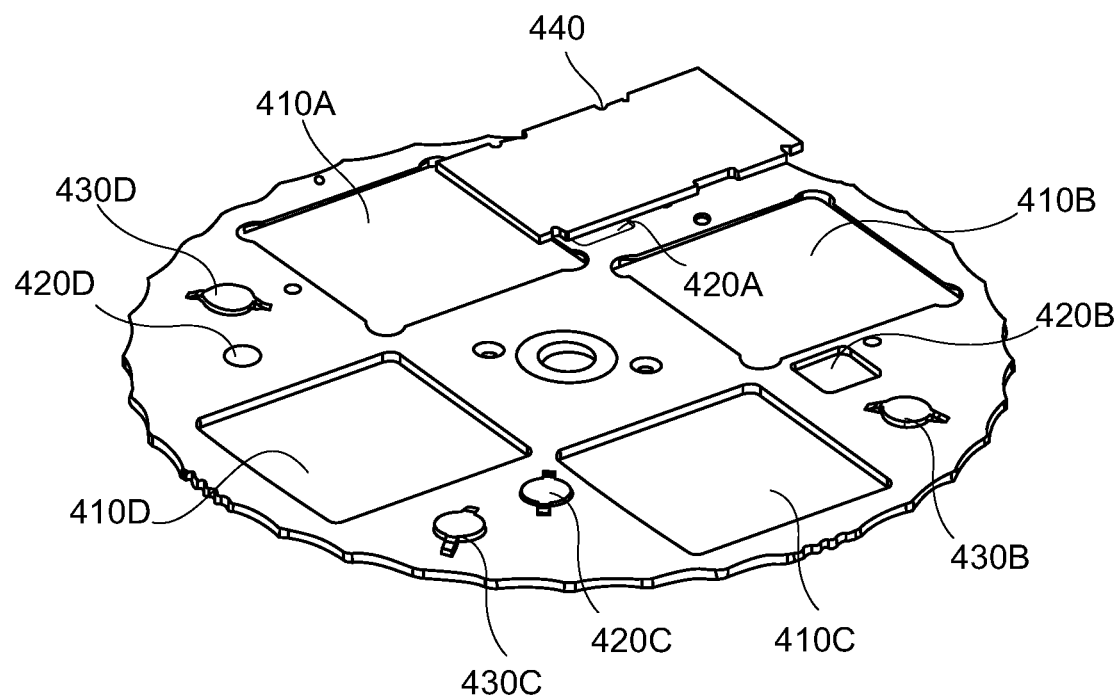
FIG. 24 shows a perspective view of the underside the x-ray filter assembly together with a filter position sensor.

As shown in FIG. 24, a filter disc 400 sensor 440 is fixed relative to the collimator device 20 casing and located in a position that overlies one of the filter identifier portions 420A, B, C and D and one of the filter reference portions 430A, B, C and D when one of the filter regions 410A, B, C and D is correctly positioned for filtering the x-ray beam from the x-ray tube 10. The filter disc 400 sensor 440 is located adjacent to but spaced apart from the filter disc 400.

The filter disc 400 sensor 440 may be formed on a PCBA.

Figure 25:
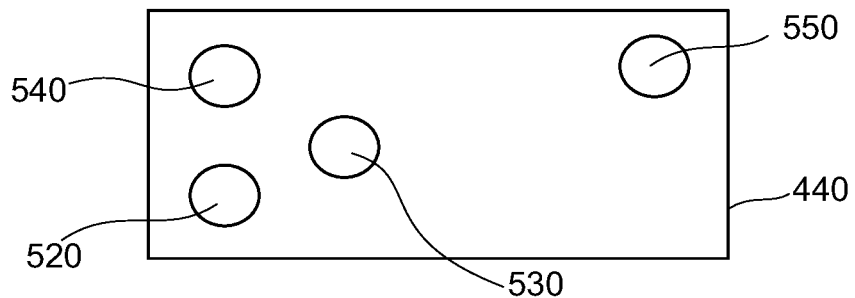
FIG. 25 shows a simplified drawing of the filter position sensor.

As shown in FIG. 25, the filter disc 400 sensor 440 can incorporate three position sensors 520, 530 and 540. Filter identifier sensor 520 is positioned so that it underlies one of the filter identifier portions 420A, B, C and D when in one of the four correct x-ray filtering positions. Reference identifier sensor 530 is positioned so that it underlies one of the filter reference portions 430A, B, C and D when in one of the four correct x-ray filtering positions. Distance sensor 540 is positioned to measure the distance to the underside of the filter disc 400.

Figure 26:
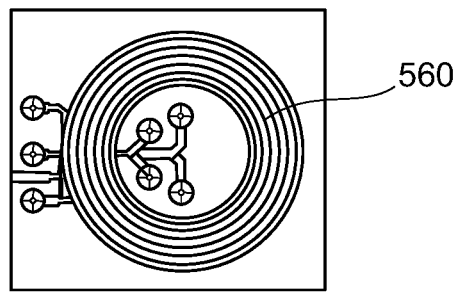
FIG. 26 shows an example coil configuration for the filter position sensor.

Each of the position sensors 520, 530 and 540 may comprise a circular spiral coil (L) 560 as shown in FIG. 26 which generates a generally symmetrical (and/or homogeneous) magnetic field. Each coil is connected in parallel to a respective capacitor (C) to form a self-resonating LC-tank circuit 204 like that described above and shown in FIG. 18. As in the previous embodiment, the outputs of the LC-tank circuits 204 are read by an LDC which generates an LDC output for each LC-tank circuit 204.

The LDC output for the LC-tank circuit 204 associated with filter identifier sensor 520 varies with the distance to the nearest part of the filter disc 400. If the filter disc 400 is in one of the four correct x-ray filtering positions, the distance detected will be the distance to the overlying one of the filter identifier portions 420A, B, C and D. As these filter identifier portions 420A, B, C and D vary in height, the LDC output can indicate which of the four filters is in use for filtering the x-ray beam, and this can be used for calculating the x-ray dose delivered.

The LDC output for the LC-tank circuit 204 associated with reference identifier sensor 530 also varies with the distance to the nearest part of the filter disc 400. If the filter disc 400 is in one of the four correct x-ray filtering positions, the distance detected will be the distance to the overlying one of the filter reference portions 430A, B, C and D. As these have a specific height, the LDC output can indicate that the filter disc 400 is correctly in one of its four positions. If it is determined that the filter disc 400 is not in on if its four correct positions, a signal may be generated to disable the delivery of x-rays.

Figure 27:
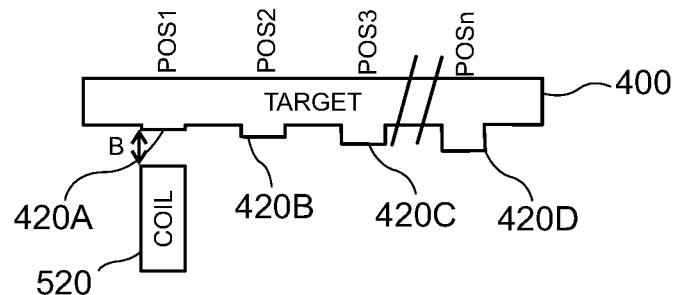
FIG. 27 shows schematically the arrangement of the filter identifier portions on the filter assembly.

FIG. 27 shows schematically the arrangement of the filter identifier portions 420A, B, C and D on the disc 400, and the coil of filter identifier sensor 520. As can be seen the filter identifier portions 420A, B, C and D each extend a different amount from the underside of the disc 400, with the filter identifier portion 420A extending the least and the filter identifier portion 420D extending the most. The distance between the coil of filter identifier sensor 520 and the nearest part of the filter identifier portion is shown as B in FIG. 27. This distance B can be detected by the LDC output value for the filter identifier sensor 520. In an example, the distance can range from 1 millimetre (mm) to 4 mm. The distance between each step that can be detected by the position sensors 520, 530 and 540.

The LDC output for the LC-tank circuit 204 associated with distance sensor 540 too varies with the distance to the nearest part of the filter disc 400, which, due to the location of the distance sensor 540 is the general underside of the filter disc 400. The distance detected should generally be the same. However, if the distance between the filter disc 400 and the sensor 440 does change (e.g., due to wear and/or due to forces applied during operation by the operator), this distance will alter the values generated by the filter position sensor 520 and the reference identifier sensor 530. The LDC output for the LC-tank circuit 204 associated with distance sensor 540 can be used to compensate for these variations so that the correct position of the filters can be detected despite the wear.

Although four filter regions 410A, B, C and D, four filter identifier portions 420A, B, C, D and four filter reference portions 430A, B, C and D are shown in this embodiment, more or fewer of these regions and portions could be provided according to the x-ray attenuation levels required. Other filter shapes (e.g. not a disc) and movement arrangements (e.g. linear rather than rotational) for x-ray filtering may be used.

Either filter identifier portions 420A, B, C, D or the filter reference portions 430A, B, C and D may be omitted if it is considered that the remaining filter identifier portions 420A, B, C, D or the filter reference portions 430A, B, C and D are sufficient to confirm the position of the filter disc 400 and/or the filter being used.

The sensor 440 may also include a temperature sensor 550 for detecting the ambient temperature. A look-up table may be used to adjust the LDC output values of the filter identifier sensor 520, reference identifier sensor 530 and/or distance sensor 540 to compensate for changes the LDC output(s) due to the temperature (so that the compensated LDC output(s) do not vary with temperature), as was previously discussed with the shutter embodiment.

As discussed above, the filter sensor 440 PCB contains three sensor channels (read out by the LDC driver) which detects the following filter disk locations:

1. The position location (Pos), from the filter identifier sensor 520, indicates the location where the disk 400 snapped into (one of the four correct x-ray filtering positions), due to a different height in each position of the filter identifier portions 420A, B, C, D.
2. The reference location (Ref), from the reference identifier sensor 530, indicates that the filter disk 400 is snapped into one of the four correct x-ray filtering positions, by the filter reference portions 430A, B, C and D which have the same height.
3. The height of the filter disk 400 in relation to the height of the distance sensor 540 at the edge of the plate 400 underside (Ref z).

The filter sensor 440 PCB also contains the temperature sensor 550, used for temperature correction.

Figure 28:
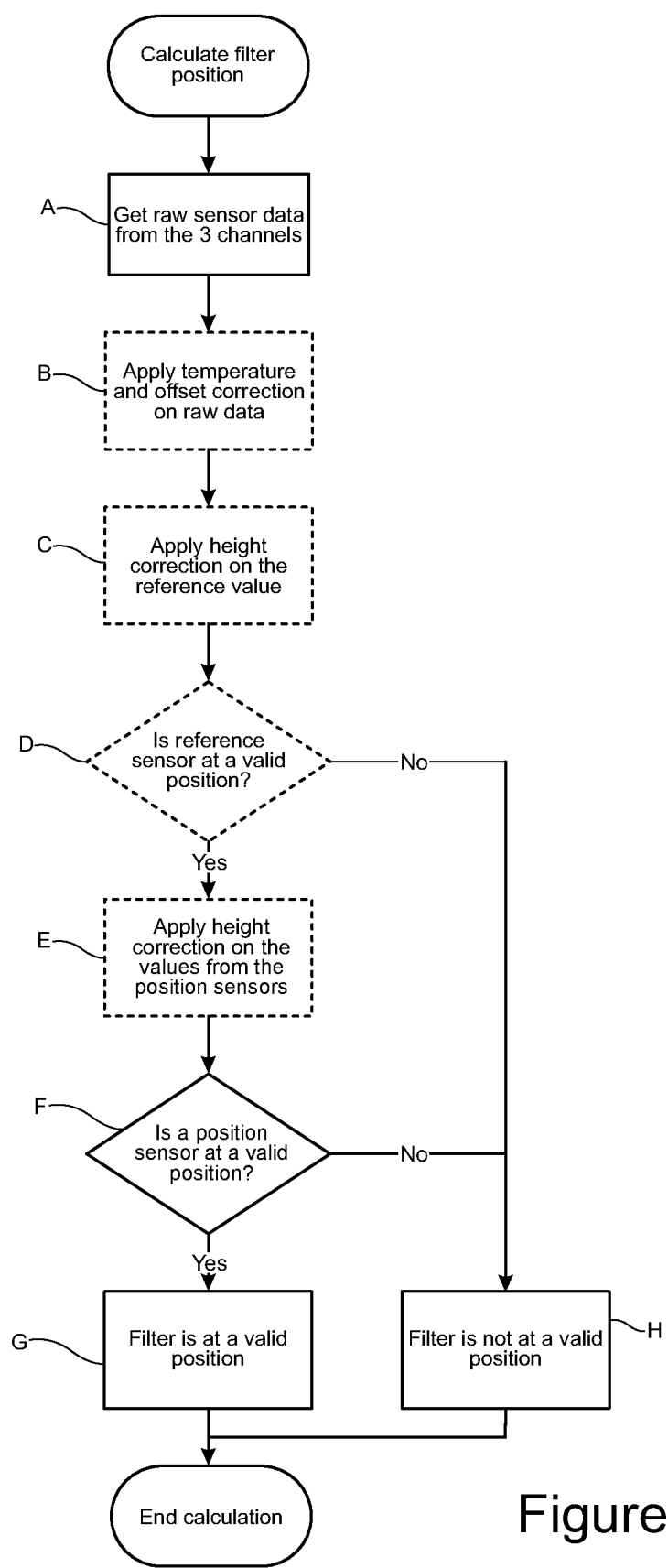
FIG. 28 shows a flow chart of steps for calculating filter assembly position.

The sensor outputs may be used in various ways to determine if the filter disk 400 is in one of the four correct x-ray filtering positions. By way of one example, during runtime execution on a processor, the following calculations, as shown in the flowchart of FIG. 28, may be performed for determining the filter disk 400 position:

1. At step A the raw sensor value of each sensor channel is retrieved from the LDC driver
2. At optional step B the raw sensor values are corrected with position and temperature offset:

<SensorID>_Sample[pos_nr] = RawSensorValue + PositionOffsetSensor<SensorID>[pos_nr] − TemperatureOffset PositionOffsetSensor<SensorID>[pos_nr] is the raw sensor value which is determined during calibration for each sensor at each valid filter position.

Temperatureoffset is the offset depending on the actual temperature as measured by the temperature sensor 550.

<SensorID>=Pos, Ref or RefZ sensor pos_nr=[0 . . . 3] represents the valid positions (of the filter regions 410A, B, C and D)

<SensorID>_Sample[pos_nr] will be continuously determined for each pos_nr

3. At optional step C, height correction of the RefZ Sample value from the height of the plate sensor is performed. Because the distance between the filter disk and the sensors may vary due to mechanical tolerances, a compensation on the raw sensor values may be necessary. Since the height distance between the plane of the sensors and the outer RefZ sensor position is known, the correction can be done by subtracting a part of the RefZ Sample value from the Ref_Sample (only a part because the height distance at the outer RefZ sensor position is larger than the height distance at the other sensors).
4. At optional step D a valid reference position is determined by comparing the Ref_result[pos_nr] within a specific range (determined during development):
A reference position is valid if Ref_result[pos_nr] between REFPOS_MIN and REFPOS_MAX.
5. If at step D it is determined that a reference position is valid, other positions can be validated.

To apply height correction on the values from the position sensors, at optional step E, a part of the RefZ_Sample[pos_nr] value will be subtracted from the Pos_Sample[pos_nr].

The part of the RefZ_Sample[pos_nr] is specific for each valid filter position.

6. At step F a valid filter position is determined by comparing the Pos_result[pos_nr] within a specific range (determined during development).

The filter position can then be output so that the filter being used to filter the x-rays is known and can be used in the dose calculation.

Figure 29:
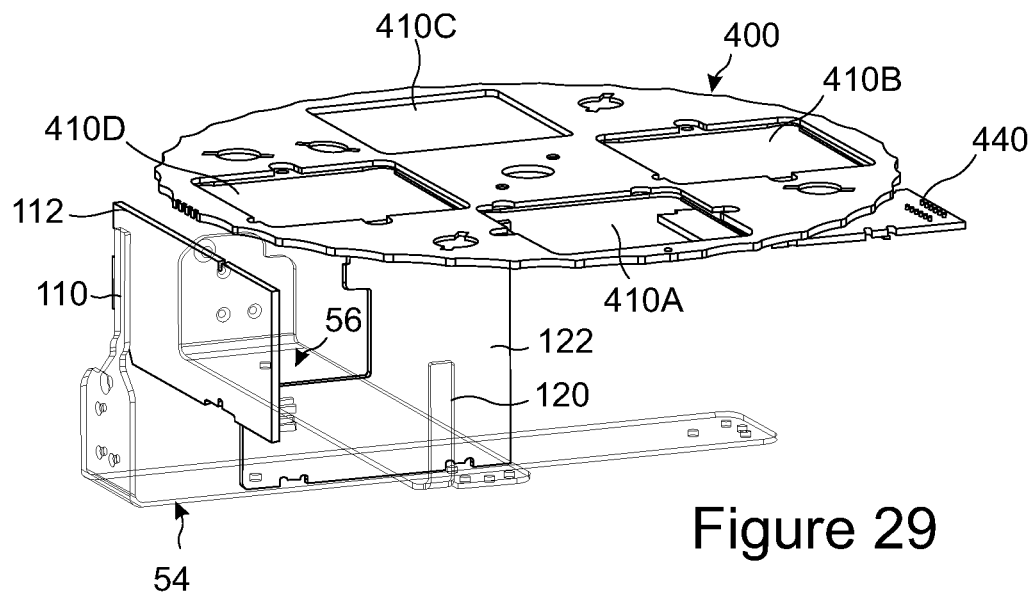
FIG. 29 shows a cross shutter, long shutter and filter assembly, together with their associated sensors.

FIG. 29 shows schematically the arrangement of the sensors, shutters and filter disc 400, which combines the shutter embodiments with the filter disc embodiments described with their variations.

Figure 30:
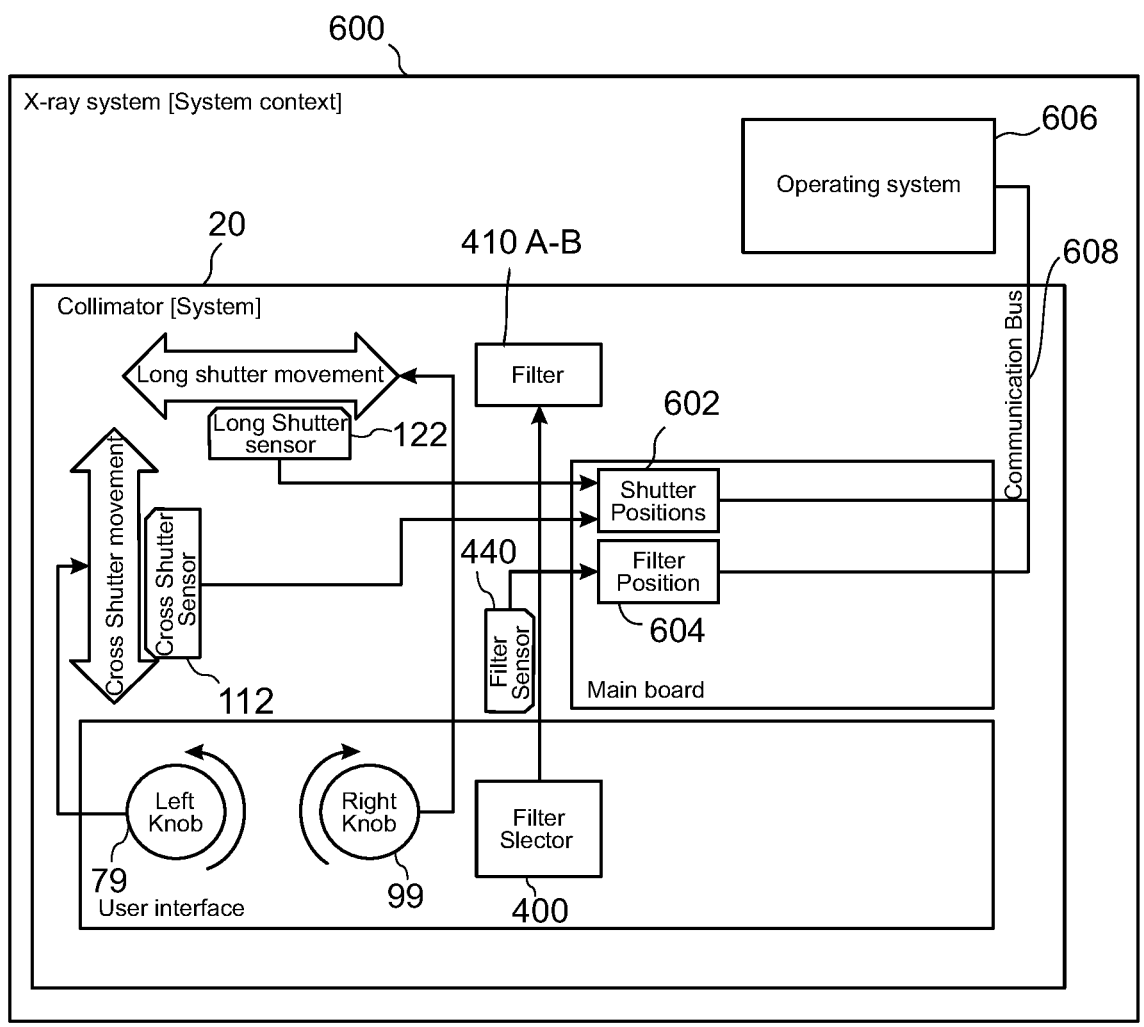
FIG. 30 is an overview of the x-ray beam control apparatus functional components.

FIG. 30 shows a diagram of the system components of an x-ray system 600 including a collimator device 20 as described above. The collimator device 20 may include a shutter positions processor 602 that receives shutter position data from the cross shutter sensor 112 and the long shutter sensor 122, and calculates the shutter opening in accordance with the flow chart of FIG. 21. The collimator device 20 may include a filter positions processor 604 that receives filter position data from the filter sensor 440, and calculates the filter position in accordance with the flow chart of FIG. 28. The calculated the shutter opening and filter position are provided to x-ray system 600 operating system 606 via communication bus 608 to enable the x-ray dose to be calculated.

The size of the x-ray opening 102 and the filter region 410A, B, C and D used affect the x-ray dose that will be received by a patient. The x-ray dose may be calculated using these values, and possibly additional information such as the power of the x-ray tube 10. The embodiment described makes it possible to automatically obtain information needed to calculate the x-ray dose from a manual collimator device 20. The information is obtained by contactless sensing and so is less susceptible to wear.

Although in the embodiment described a collimator 20, comprising moveable shutters and an adjustable filter 400 is used an x-ray beam control apparatus, it should be understood that the invention is applicable to other x-ray beam control arrangements—such as those having moveable shutters with no adjustable filter, or an adjustable filter but no moveable shutters.

Although the embodiment uses particular inductor coil (L) arrangements (asymmetric and symmetric), it should be understood that other coil arrangements may also be used in accordance with the invention. For example, the coils may be a different shape or layout.

It is not essential that two identical asymmetric coils are used for shutter position sensing. For example, only one coil (or more than two coils) may be used.

The steps shown in the flowcharts do not have to be performed in the order shown. Not all the steps shown in the flowcharts are essential to the invention, and some steps may be omitted (examples of optional steps of the flow charts are shown by dashed boxes in FIGS. 21 and 28). Indeed, the flowcharts and the associated description are just one way of using the sensor data to determine the shutter position and/or filter disk position—and many other algorithms may be used.

Contactless sensing may be provided by a different type of sensor. The use of an inductive sensor and LC-tank arrangement is not essential to the invention.

For linear position sensing the use of a capacitive sensor with (a)symmetrical surfaces equivalent to the set-up with coils described above may be used as a suitable alternative, by measuring the capacitance between the target surface and the (a)symmetrical sensor surfaces.

Likewise, a combination of (a)symmetrical surfaces could be detected with a linear array of (optical or ultrasonic) sensors measuring the width of the (reflecting) asymmetrical surface.

In an alternative set-up various contactless sensing techniques, such as optical, radar and/or ultrasonic sensing, may be used so that the distance between shutters may be measured directly.

For discrete filter position sensing any sensor capable of contactless (distance) sensing (like optical, radar and/or ultrasonic sensing) can be used to detect the distance to the targets at the three sensing positions.

In addition to using two pairs of shutter blades, it is possible to construct a manual collimator with four independently moving shutters, equipped with four linear position sensors indicating the absolute position of each of these shutter blades.

In one aspect an embodiment of the present invention provides an x-ray beam control apparatus including at least one moveable x-ray attenuating member 54, 58; 400 and at least one position sensor 112, 122; 440. The position sensor 112, 122; 440 is configured to contactlessly detect movement of at least one of the attenuating members 54, 58; 400 and to output a signal indicative of the position of the attenuating member 54, 58; 400. The at least one position sensor 112, 122; 440 may be an inductive position sensor, although this is not essential.

The x-ray attenuating member 54, 58; 400 may be formed of metal, such as lead, tungsten, aluminum, copper, other x-ray block or attenuating material, or the like. The x-ray attenuating member 54, 58; 400 may completely or partially block the passage of x-rays.

The x-ray attenuating member 54, 58; 400 may be moved by a control mechanism, for example a control mechanism operated manually by a clinician or other user. The movement of the attenuating member 54, 58; 400 may be detected by directly detecting movement of the attenuating member 54, 58; 400 or by detecting movement of some other component that moves with the attenuating member 54, 58; 400, such as a part of the control mechanism.

The position sensor 112, 122; 440 may include an electrical coil 200A, 200B; 560 configured to contactlessly detect movement of at least one of the attenuating members 54, 58; 400 by electrical induction. The electrical coil 200A, 200B; 560 may be part of an LC-tank electrical circuit 204 or LC resonant circuit with an inductor (L) and a capacitor (C)—for example comprising the electrical coil 200A, 200B; 560 connected electrically in parallel to a capacitor. Other types of contactless detecting means or sensors may be used additionally or alternatively.

A temperature sensor 220, 222; 550 may be provided which is configured to detect the temperature of the position sensor 112, 122; 440 and a processor may adjust the signal indicative of the position of the attenuating member 54, 58; 400 to compensate for the effect of temperature on the position sensor 112, 122; 440. The signal indicative of the position of the attenuating member 54, 58; 400 can vary in dependence on the temperature of environment in which the sensor is located. The signal for any given target position may reduce as temperature increases. If this relationship is known (or can be estimated), the signal can be corrected for temperature variations—for example using a look-up table.

The corrected signal may give an accurate indication of the attenuating member position independent of the ambient temperature.

A distance sensor 540 may be provided which configured to measure a distance between the x-ray attenuating member 54, 58; 400 and the position sensor 112, 122; 440. A processor may then adjust the signal indicative of the position of the attenuating member 54, 58; 400 to compensate for the effect of distance between the x-ray attenuating member 54, 58; 400 and the position sensor 112, 122; 440. The distance between the position sensor 112, 122; 440 and attenuating member 54, 58; 400 may have a significant effect on the signal. The signal may be reduced If the distance between the position sensor 112, 122; 440 and attenuating member 112, 122; 440 increases (e.g., due to mechanical wear/play). There may be less difference between minimum and maximum signal values If the distance between the position sensor 112, 122; 440 and attenuating member 54, 58; 400 increases. If the distance between the position sensor 112, 122; 440 and attenuating member 54, 58; 400 is known (or can be estimated), the signal can be corrected for the distance variations—for example using a look-up table. The corrected signal may give an accurate indication of the attenuating member 54, 58; 400 position independent of the distance between the attenuating member 54, 58; 400 and the position sensor 112, 122; 440.

One of or both of a temperature sensor 220, 222; 550 and a distance sensor 540 may be provided.

In one arrangement at least one of the attenuating members 54, 58; 400 is a collimator member 56, 60 configured to substantially block x-rays.

A plurality of the collimator members 56, 60 may define a shape of the x-ray beam.

For example, a first set of the collimator members 56, 60 may be provided, at least one of which is configured to move along a first path, and a second set of the collimator members 56, 60, at least one of which is configured to move along a second path that is substantially perpendicular to the first path. At least one of the position sensors 112, 122; 440 may be associated with each of the first and second sets of the collimator members 56, 60. The first and second sets of collimator members 56, 60 may define a variable size opening through which x-rays can pass. One or all of the first set of the collimator members 56, 60 may be moveable (typically there will be two collimator members 56, 60 in each set). One or all of the second set of the collimator members 56, 60 may be moveable (typically there will be two collimator members in each set).

In an embodiment, a first pair of the collimator members 56, 60 can be configured to move in synchronisation towards and away from each other along a first path, and a second pair of the collimator members 56, 60 can be configured to move in synchronisation towards and away from each other along a second path that is substantially perpendicular to the first path. As the collimator members 56, 60 of each pair move in synchronisation (e.g. due to the mechanical drive arrangement), if the position of one of the pair is known, the position of the other one of the pair can be deduced (as its movement will be identical but in the opposite direction). One of the position sensors 112, 122; 440 may associated with each of the first and second pairs of the collimator members 56, 60. A position sensor 112, 122; 440 for each collimator member 56, 60 of each pair may not be necessary to the synchronised movement of the pair but may be provided if desired.

Alternatively, the collimator members 56, 60 may not move in synchronisation (e.g. the collimator members 56, 60 may all move independently or some of the collimator members 56, 60 are fixed), in which case a position sensor 112, 122; 440 for each moveable collimator member 56, 60 may be provided.

A moveable target member 110, 120 may be associated with at least one of the collimator members 56, 60, the target member 110, 120 being configured such that movement thereof is indicative of movement of the associated collimator member 56, 60. The position sensor 112, 122; 440 may configured to detect movement of the target member 110, 120. The target member 110, 120 may extend from the associated collimator member 56, 60 (e.g. it may be integrally formed with the collimator member 56, 60 or attached to the collimator member 56, 60). The target member 110, 120 may instead be coupled to a control mechanism for the collimator members 56, 60 so that it moves with the collimator members 56, 60 but is not attached to them.

The electrical coil 200A, 200B; 560 of the position sensor 112, 122; 440 may be configured to generate a differing or non-homogeneous magnetic field along its length so that the signal indicative of the position of the attenuating member 54, 58; 400 varies along the length of the electrical coil 200A, 200B; 560. The coil 200A, 200B; 560 may be located adjacent to but spaced apart from a target 110, 120 associated with the attenuating member 54, 58; 400 so that the target 110, 120 moves along the length of the coil 200A, 200B; 560 as the attenuating member 54, 58; 400 undergoes its range of movement. Such a coil may be generally rectangular.

The coil 200A, 200B; 560 may comprise a plurality of turns that are increasingly spaced apart along the length of the coil. With such an arrangement, the signal will vary in dependence upon the position of the target along the length of the coil. The signal may not vary linearly with the position of the target along the length of the coil. Optionally, the signal may be linearised.

Optionally, two substantially identical the electrical coils 200A, 200B; 560 configured to generate a non-homogeneous magnetic field along their length are provided, the two electrical coils 200A, 200B; 560 being positioned side by side along their lengths but oriented in opposite directions. With such an arrangement, the signal will vary in the opposite way in dependence upon the position of the target 110, 120 along the length of each coil 200A, 200B; 560. At one attenuating member position a first of the coils will output a maximum value while the other coil outputs a minimum value, and vice versa. The two signals can be processed to compensate for mechanical wear of the apparatus At least one of the attenuating members 54, 58; 400 may be an x-ray filter assembly moveable between a plurality of filter positions, the filter assembly having a plurality of filter regions 410A, B, C, D providing differing x-ray attenuation at each of the filter regions 410A, B, C, D.

The apparatus may include such a filter assembly in addition to one or more collimator members 56, 60, or the apparatus may include only a filter assembly or only collimator members 56, 60.

When a filter is included, a filter identifier portion 420A, B, C, D may be associated with each of the filter regions 410A, B, C, D, each of the filter identifier portions 420A, B, C, D having a respective different electrical characteristic that is detectable by the position sensor 112, 122; 440 and being configured such that detection thereof is indicative of the filter position. The filter assembly may comprise the filter identifier portions 420A, B, C, D. The filter identifier 420A, B, C, D portions may be formed on or in the filter assembly so that they each extend a different amount above or below a surface of the filter assembly. The height above or below the surface may be detectable by the position sensor 112, 122; 440.

In addition to, or alternatively to, the filter identifier portions 420A, B, C, D, a filter reference portion 430A, B, C, D may be associated with each of the filter regions 410A, B, C, D, each of the filter reference portions 430A, B, C, D having a different electrical characteristic to the surrounding area and which is detectable by the position sensor 112, 122; 440, and each of the filter reference portions 430A, B, C, D being configured such that detection thereof is indicative of the filter position. If the filter position is not one where one of the filter regions 410A, B, C, D is correctly positioned in the x-ray path, this can be detected, and, for example, the x-ray delivery may be stopped. The filter assembly may comprise the filter reference portions 430A, B, C, D. The filter reference portions 430A, B, C, D may be formed on or in the filter assembly so that they all extend by the same amount above or below a surface of the filter assembly. The height above or below the surface may be detectable by the position sensor 112, 122; 440.

The x-ray filter assembly may be mounted for rotation about an axis between the plurality of filter positions. The filter assembly may be generally disc-shaped. Rotation of the filter assembly may be performed manually by an operator.

An embodiment of the invention also provides an x-ray device including an x-ray tube and an x-ray beam control apparatus as defined above.

An embodiment of the invention also provides a method of obtaining data for use in detecting a position of a collimator member (54, 58) of an x-ray beam control apparatus having at least one position sensor (112, 122) that is configured to contactlessly detect movement of at least one of the collimator member (54, 58), the method including: reading sensor data from the least one position sensor (112, 122); and correcting the sensor data. The least at least one position sensor (112, 122) may optionally be an inductive position sensor.

The method may include determining a temperature at the collimator member (54, 58), and wherein the step of correcting the sensor data includes adjusting the sensor data to compensate for an effect of the temperature.

The method may include determining a distance between the collimator member (54, 58) and the at least one position sensor (112, 122), and wherein the step of correcting the sensor data includes adjusting the sensor data to compensate for an effect of the distance.

The at least one position sensor (112, 122) may include two substantially identical electrical coils (200A, 200B; 560) configured to generate a non-homogeneous magnetic field along their length, the two electrical coils (200A, 200B; 560) being positioned side by side along their lengths but oriented in opposite directions, and wherein the step of correcting the sensor data includes determining the distance between the collimator member (54, 58) and the at least one position sensor (112, 122) in dependence upon data from the two substantially identical electrical coils (200A, 200B; 560), and adjusting the sensor data to compensate for an effect of the distance.

The step of correcting the sensor data includes adjusting the sensor data to compensate non-linearity of the sensor data in response to movement of the collimator member (54, 58).

An embodiment of the invention also provides a method of obtaining data for use in detecting a position of an x-ray filter assembly of an x-ray beam control apparatus, the filter assembly being moveable between a plurality of filter positions and having a plurality of filter regions (410A, B, C, D) providing differing x-ray attenuation at each of the filter regions (410A, B, C, D), and the x-ray beam control apparatus having at least one position sensor (440) that is configured to contactlessly detect movement of the filter assembly, the method including: reading sensor data from the least one position sensor (440); and correcting the sensor data. The at least one position sensor (440) may optionally be an inductive position sensor.

The method may include determining a temperature at the x-ray filter assembly, and wherein the step of correcting the sensor data includes adjusting the sensor data to compensate for an effect of the temperature.

The method may include determining a distance between the filter assembly and the at least one position sensor (440), and wherein the step of correcting the sensor data includes adjusting the sensor data to compensate for an effect of the distance.

Some embodiments of the invention may eliminate or reduce the problems with devices currently available to the market. For example:

1) Some embodiments employ contactless measurement so that parts are not subjected to wear, therefore no or less deterioration/wear of the of the parts is expected.

2) Some embodiments have a high measurement resolution which improves accuracy.

3) Some embodiments have a mechanically stable platform where mechanical play is eliminated or can be measured and therefore compensated.

4) Some embodiments are insusceptible or less susceptible to pollution and aging, in contrast to, for example, optical measurement solutions.

Some embodiments include an x-ray beam control apparatus including: means for collimating an x-ray beam; and means for contactlessly detecting movement of the means for collimating the x-ray beam and generating a signal indicative of a position of the means for collimating the x-ray beam. Examples of the means for collimating an x-ray beam include the moveable x-ray attenuating member (54, 58; 400). Examples of the means for contactlessly detecting movement of the means for collimating the x-ray beam and generating a signal indicative of a position of the means for collimating the x-ray beam include the position sensor (112, 122; 440).

In some embodiments, the apparatus includes means for correcting data from the means for contactlessly detecting movement of the means for collimating the x-ray beam and generating the signal indicative of the position of the means for collimating the x-ray beam. Examples of the means for correcting data include components of an associated printed circuit board or printed circuit board assembly, a processor 602 or 604, operating system 606, or the like.

Some embodiments can therefore be expected to provide in a long, maintenance-free and error-free lifetime.

The invention claimed is:

1. An x-ray beam control apparatus including:
at least one moveable x-ray attenuating member, and
at least one inductive position sensor comprising a pair of oppositely oriented asymmetric electrical coils, wherein:
the position sensor is configured to contactlessly detect movement of at least one of the attenuating members and to output a signal indicative of the position of the attenuating member; and the position sensor is configured to generate a non-homogeneous magnetic field that varies along a length of the position sensor.

2. The apparatus of claim 1, wherein the electrical coils of the position sensor are configured to contactlessly detect movement of at least one of the attenuating members by electrical induction.

3. The apparatus of claim 2, wherein the position sensor includes an LC tank circuit including an inductor (L) and a capacitor (C) of which the electrical coils form at least a portion of the inductor, the LC tank circuit optionally:
having an output that is readable by inductance to digital converter; and/or
having a resonant frequency that varies in dependence upon the detected movement.

4. The apparatus of claim 1, including at least one of:
a temperature sensor configured to detect the temperature of the position sensor and a processor operable to adjust the signal indicative of the position of the attenuating member to compensate for the effect of temperature on the position sensor; and
a distance sensor configured to measure a distance between the x-ray attenuating member and the position sensor and a processor operable to adjust the signal indicative of the position of the attenuating member to compensate for the effect of distance between the x-ray attenuating member and the position sensor.

5. The apparatus of claim 1, wherein at least one of the attenuating members is a collimator member configured to block x-rays.

6. The apparatus of claim 5, wherein a first set of the collimator members is provided, at least one of which is configured to move along a first path, and a second set of the collimator members is provided, at least one of which is configured to move along a second path that is substantially perpendicular to the first path, and wherein at least one of the position sensors is associated with each of the first and second sets of the collimator members.

7. The apparatus of claim 6, wherein the first set of the collimator members comprises a first pair of the collimator members that are configured to move in synchronisation towards and away from each other along the first path, and the second set of the collimator members comprises a second pair of the collimator members that are configured to move in synchronisation towards and away from each other along the second path.

8. The apparatus of claim 5, wherein a moveable target member is associated with at least one of the collimator members, the target member being configured such that movement thereof is indicative of movement of the associated collimator member, and wherein the position sensor is configured to detect movement of the target member.

9. The apparatus of claim 8, wherein the target member extends substantially perpendicularly from the associated collimator member.

10. The apparatus of claim 5, wherein:
the electrical coils are configured to generate the non-homogeneous magnetic field along lengths thereof so that the signal indicative of the position of the attenuating member varies in dependence upon the position of the attenuating member along the lengths of the electrical coils.

11. The apparatus of claim 10, wherein the position sensor includes two substantially identical electrical coils, the two electrical coils being positioned side by side along their lengths.

12. The apparatus of claim 1, wherein at least one of the attenuating members is an x-ray filter assembly moveable between a plurality of filter positions, the filter assembly having a plurality of filter regions providing differing x-ray attenuation at each of the filter regions.

13. The apparatus of claim 12, wherein a filter identifier portion is associated with each of the filter regions, each of the filter identifier portions having a respective different electrical characteristic that is detectable by the position sensor and being configured such that detection thereof is indicative of the type of filter used.

14. The apparatus of claim 12, wherein a filter reference portion is associated with each of the filter regions, each of the filter reference portions having a different electrical characteristic to the surrounding area and which is detectable by the position sensor, each of the filter reference portions being configured such that detection thereof is indicative of the filter position.

15. The apparatus of claim 14, wherein the filter assembly comprises filter reference portions.

16. An x-ray device including an x-ray tube and an x-ray beam control apparatus of claim 1 for controlling x-rays from the x-ray tube.

17. A method of obtaining data for use in detecting a position of a collimator member of an x-ray beam control apparatus having at least one inductive position sensor that is configured to contactlessly detect movement of the collimator member, the method including:
producing a non-homogeneous magnetic field by an asymmetrical electrical coil of the position sensor that varies along a length of the asymmetrical electrical coil;
reading first sensor data from the position sensor;
calculating a distance between the position sensor and the collimator member based on at least one of the first sensor data or second sensor data from an additional position sensor comprising a symmetrical electrical coil; and
correcting the first sensor data based on the calculated distance.

18. The method of claim 17, further including:
determining a temperature at the collimator member, and wherein the step of correcting the sensor data includes adjusting the sensor data to compensate for an effect of the temperature.

19. An x-ray beam control apparatus including:
a moveable attenuating member; and
a position sensor for contactlessly detecting movement of the moveable attenuating member and generating a signal indicative of a position of the moveable attenuating member, wherein:
the moveable attenuating member comprises filter regions with a filter identifier associated with each of the filter regions; and
each of the filter identifiers has a different electrical characteristic detectable by the position sensor and indicative of an identity or position of the respective filter region.

20. The apparatus of claim 19, further comprising a processor for correcting data from the position sensor and generating the signal indicative of the position of the moveable attenuating member.

* * * * *